(12) United States Patent
Gelphman

(10) Patent No.: US 6,556,783 B1
(45) Date of Patent: *Apr. 29, 2003

(54) METHOD AND APPARATUS FOR THREE DIMENSIONAL MODELING OF AN OBJECT

(76) Inventor: Janet L. Gelphman, 3308 Duchess Trail, Dallas, TX (US) 75229

( * ) Notice: Subject to any disclaimer, the term of this patent is extended or adjusted under 35 U.S.C. 154(b) by 0 days.

This patent is subject to a terminal disclaimer.

(21) Appl. No.: 09/323,516

(22) Filed: Jun. 1, 1999

Related U.S. Application Data

(63) Continuation-in-part of application No. 08/784,349, filed on Jan. 16, 1997, now Pat. No. 5,920,735.

(51) Int. Cl.⁷ .............................................. G03B 37/02
(52) U.S. Cl. ......................... 396/20; 356/603; 356/610; 396/429
(58) Field of Search ............................ 396/20, 24, 419, 396/428, 429, 661; 356/3.09, 3.1, 601, 602, 603, 604, 606, 610

(56) References Cited

U.S. PATENT DOCUMENTS

| | | | | |
|---|---|---|---|---|
| 4,185,913 A | * | 1/1980 | Di Matteo et al. | 356/375 |
| 4,335,962 A | * | 6/1982 | Di Matteo et al. | 356/376 |
| 4,943,821 A | * | 7/1990 | Gelphman et al. | 396/24 |
| 5,024,529 A | * | 6/1991 | Svetkoff et al. | 356/376 |
| 5,218,427 A | * | 6/1993 | Koch | 356/376 |
| 5,920,735 A | * | 7/1999 | Gelphman | 396/24 |

* cited by examiner

Primary Examiner—David M. Gray
(74) Attorney, Agent, or Firm—Anderson, Levine & Lintel, LLP

(57) ABSTRACT

A topological panorama camera has a track or other system upon which a linescan camera can move in one, two or three dimensions while recording the image of an object. The path, speed, acceleration, scan rate and direction of the linescan camera can be controlled, as can the path, speed, acceleration and direction of the object. A pattern is projected onto an object of arbitrary shape and is imaged by the topological panorama camera in one or more passes. The image of the pattern received by the camera is analyzed to determine the exterior shape of the object.

33 Claims, 25 Drawing Sheets

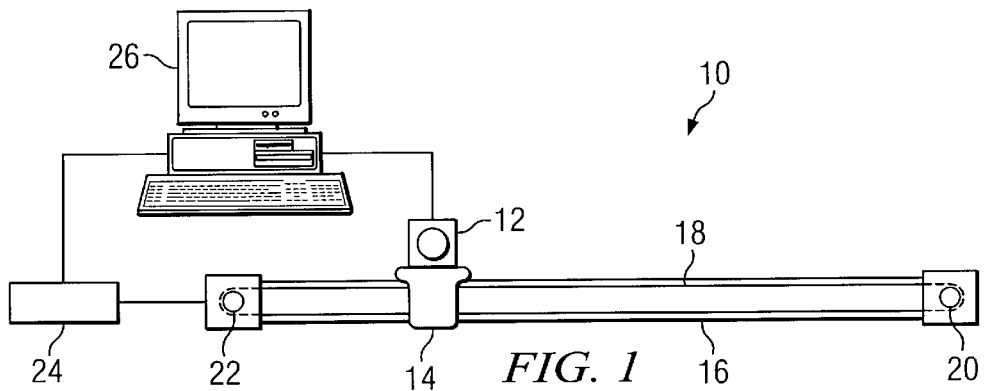
*FIG. 1*
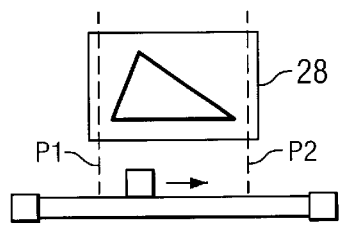
*FIG. 2a*
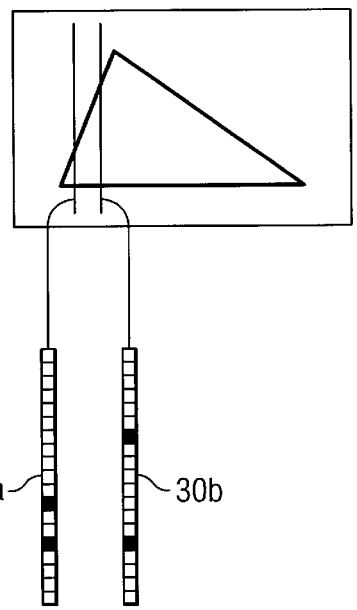
*FIG. 2b*
```
SEGMENT:
STARTING POSITION OF SCAN:
SEGMENT LENGTH:
CARRIAGE DIRECTION:
CARRIAGE SPEED:
CARRIAGE ACCELERATION:
SCAN DIRECTION:
SCAN RATE:
SCAN RATE ACCELERATION:
OVERLAP:
LENS MAGNIFICATION:
EXPOSURE CONTROL:
```
*FIG. 3*
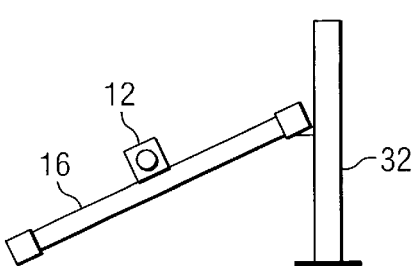
*FIG. 4*
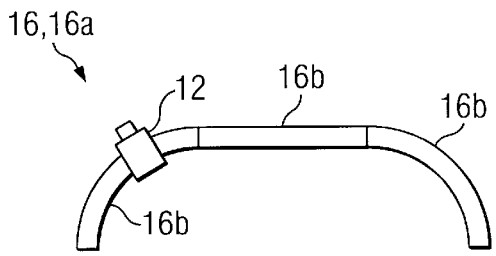
*FIG. 5*

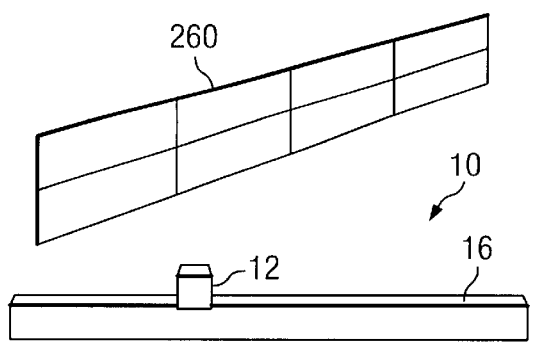 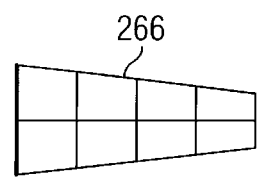
FIG. 33a
FIG. 33b
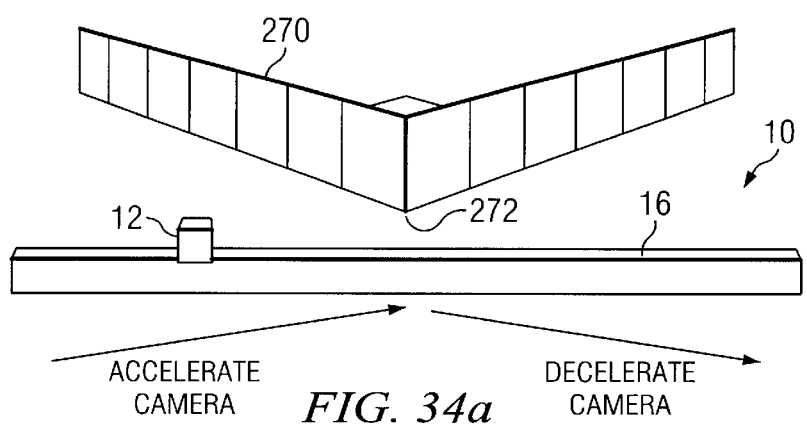
FIG. 34a
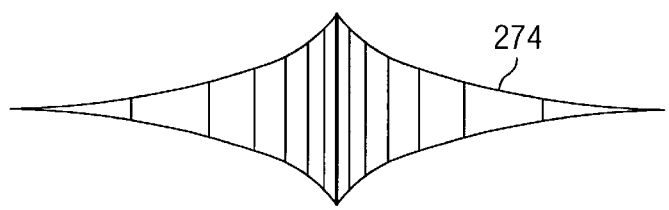
FIG. 34b
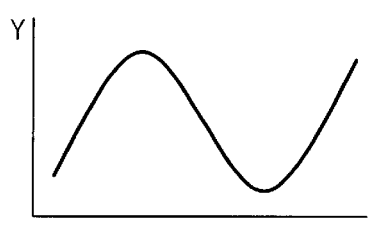 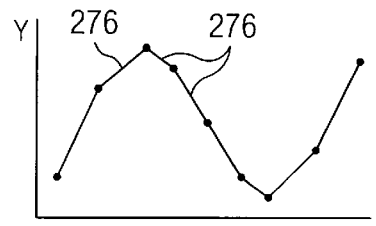
FIG. 35a
FIG. 35b

CAMERA PATH

CAMERA PATH

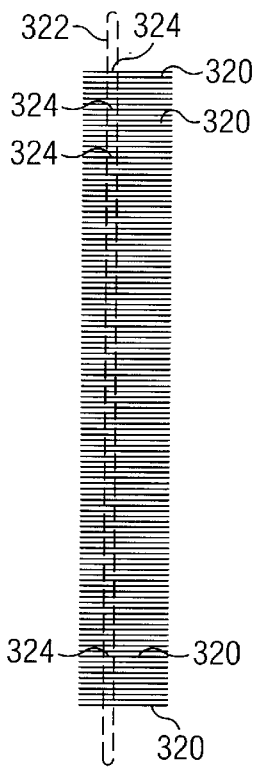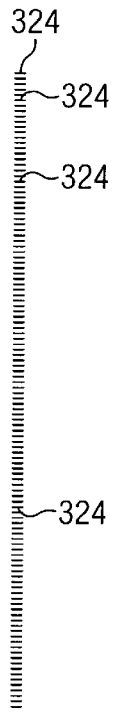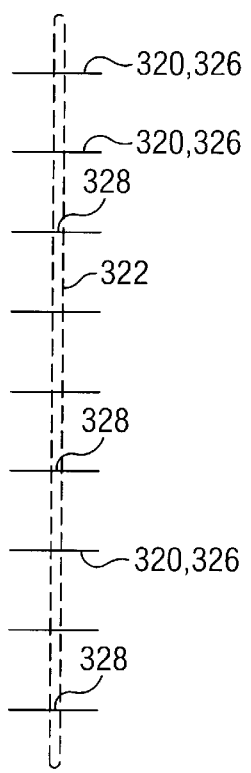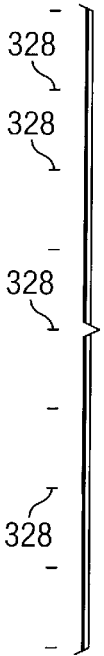
FIG. 39a  FIG. 39b  FIG. 39c  FIG. 39d
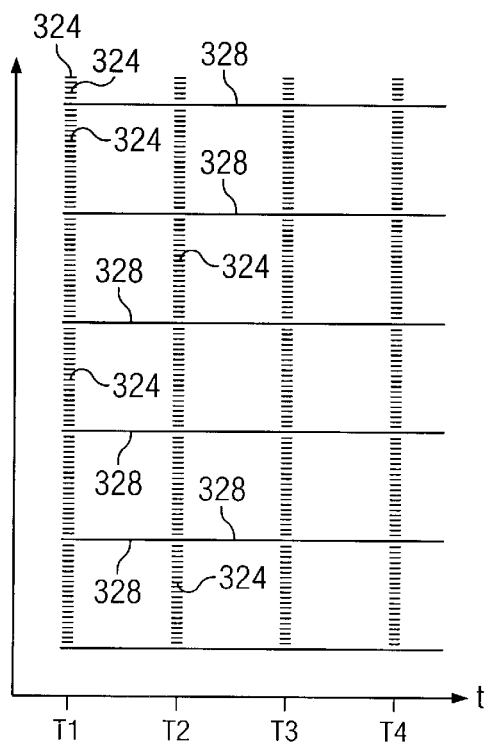
FIG. 40

METHOD AND APPARATUS FOR THREE DIMENSIONAL MODELING OF AN OBJECT

Cross-Reference To Related Applications

This application is a continuation-in-part of U.S. Pat. No. 5,920,735 issued Jul. 6, 1999 (U.S. Ser. No. 08/784,349, filed Jan. 16,1997), entitled "Method and Apparatus to Observe the Geometry of Relative Motion" to Gelphman, which is incorporated by reference herein.

BACKGROUND OF THE INVENTION

1. Technical Field

This invention relates in general to imaging and, more particularly, to a method and apparatus of using a topological panoramic camera for three dimensional scanning of an object.

2. Description of the Related Art

In many computer applications, it is desirable to have the ability to generate a file describing a three dimensional object. For example, in computer simulations, wax or clay models are produced by artists. Computer files are then generated from the models. The models can then be manipulated using computer animation techniques.

Three dimensional scanning systems, or 3D scanners, probe a three dimensional object and produce a computer file which describes its surface. 3D scanners are used in a variety of fields, including medical imaging, topography, computer aided-design/computer aided manufacturing (CAD/CAM), architecture, reverse engineering and computer animation/virtual reality.

Early 3D scanners used mechanical probes which moves across an object's surface. A mechanical arm which connects to the probe moves in accordance with the contours of the surface. The arm movements are translated into information describing the location of the probe at multiple points. Digital systems are stow, since they must touch each position on the object at which a measurement reading is taken, and are not suitable for scanning soft objects such as clay.

More recently, optical 3D scanners have become available. 3D scanners of this type project a pattern of light on an object and determine the location of points on the object using triangulation techniques. These systems can be extremely complicated and, therefore, costly.

SUMMARY OF THE INVENTION

In the present invention, the shape of an object can be determined by scanning the object through an optical slit moving using relative motion between the slit and the object. Light is projected on said object in a predetermined sequence to form a pattern received through the slit as the object is scanned. An image of the pattern received through said optical slit is recorded and the recorded image is analyzed to determine the shape of said object.

BRIEF DESCRIPTION OF THE DRAWINGS

For a more complete understanding of the present invention, and the advantages thereof, reference is now made to the following descriptions taken in Conjunction with the accompanying drawings, in which:

FIG. 1 illustrates a first embodiment of a topological panorama camera;

FIGS. 2a and 2b illustrate the process of recording images using the topological panorama camera;

FIG. 3 illustrates a interface to set user defined variables in controlling the topological panorama camera;

FIG. 4 illustrates a second embodiment of a topological panorama camera;

FIG. 5 illustrates a third embodiment of a topological panorama camera;

FIGS. 33a and 33b illustrate the use of the topological panorama camera to visualize amplitude of a sound wave;

FIGS. 34a and 34b illustrate use of the topological panorama camera to visualize the Doppler effect;

FIGS. 35a and 35b illustrate piecewise linearization of a camera path.

FIGS. 39a through 39d illustrate formation of the grid by using a column of segments, a portion of which is received through the slit of the camera;

FIG. 40 illustrates a grid generated through the column of segments shown in FIGS. 39a–d;

DETAILED DESCRIPTION OF THE PREFERRED EMBODIMENT

Figure 6:
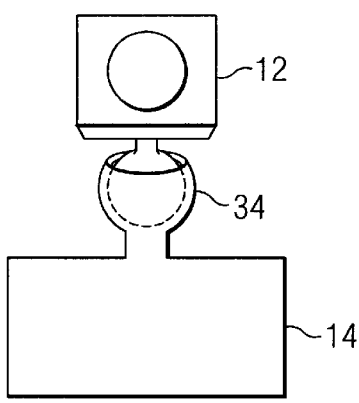
FIG. 6 illustrates an alternative embodiment for mounting the linescan camera portion of the topological panorama camera.

The present invention is best understood in relation to FIGS. 1–49 of the drawings, like numerals being used for like elements of the various drawings.

FIG. 1 illustrates a first embodiment of a topological panorama camera 10. The topological panorama camera 10 comprises a scanning camera 12 coupled to carriage 14. Carriage 14 is slidably engaged on track 16. Belt 18 is coupled to carriage 14 to drive the carriage 14 in either direction along the track 16. One end of belt 18 is disposed about rotor 20. The other end of belt 18 is driven by step motor 22. Motor 22 is coupled to controller 24. Controller 24 is coupled to a serial port of computer 26 The computer 26 is also connected to scanning camera 12 through an interface card.

The motor 22 and the controller 24 are available from AMERICAN PRECISION INDUSTRIES, INC. of Buffalo, N.Y.

Linescan cameras are available from a number of sources, such as EG& G RETICON, which produces a linescan camera having a vertical linear array of light sensitive charge coupled devices which is one pixel wide by 1024 pixels long. This linescan camera can sample lines of light from a scene at a user defined rate of up to 35,000 line sec. While the high resolution and scan rate of this camera can produce a sharp image, lesser specifications would also be acceptable.

Linescan cameras are useful for recording the image because they are commercially available. However, any image recorder which can be configured to image a line of energy, typically light (hereinafter, a "line sensing image recorder") could be used in the topological panorama camera 10, including cameras which use a matrix of CCD or other photosensitive devices, so long as the matrix could be electrically or mechanically configured to provide a line through which light from the object is received and sent to computer 26. Film-based cameras could also be used, although the cost and time in developing film is a problem in many situations. While normally a line sensing image recorder receives visible light, other spectrums could also be detected, such as infra-red, ultra-violet x-rays and so on. Further, a line sensing image recorder could image other energy fields such as magnetic fields.

Since the output of the linescan camera is typically an analog signal, the computer 26 uses an interface card, such as one sold by GIRARD ELECTRONICS of Gray, Tenn. to digitize and store the information. This card converts the camera video signal into an eight-bit/pixel digital form (i.e., a 256 grayscale image). The interface board has a double line memory buffer which enables maximum processing speeds. After a line of video signal is acquired in the card's first memory location, the next line is directed to the second memory location. The first line of video information is then processed and transferred to the host computer memory while the second line is being acquired. After acquiring the second line into the interface card, the video signal is directed to the first memory buffer location as the second line is processed and transferred to the host computer. The process continues by alternating the memory locations for receiving and processing until the image is complete. The architecture allows a continuous image to be formed with minimal memory requirements. While the interface card discussed above is a grayscale memory card, a color interface card could be used in conjunction with a color linescan camera as well.

In operation, the user programs desired criteria into computer 26 to define a path for scanning camera 12 along carriage 14. The scanning camera 12 is typically a linescan camera which has a column of CCD (charge coupled device) cells, where the CCD cells generate a charge corresponding to the amount of light received by the cells. The line of CCD cells operates as an optical slit as discussed in U.S. Pat. No. 4,943,821. For each line scan, the scanning camera outputs information to the computer 26. The computer 26 receives the information for each line scan and stores the information along with information from previous line scans to form an image.

A simple example of a scan operation is shown in FIGS. 2a and 2b, where the scanning camera 12 travels a path from a first point (P1) on the carriage to a second point (P2) on the carriage at a predetermined velocity (preferably, the carriage 14 is accelerated up to the desired velocity prior to reaching P1 and decelerates to a stop after P2). An object 28 is placed in front of the camera 12 along the path. In the example shown in FIG. 2a, the object 28 is a flat surface with a drawing of a triangle. As the linescan camera 12 travels along the path, it receives light through its lens, which is received by the CCD. At predetermined intervals, the image from the linescan camera 12 is output to the computer. The image from the linescan camera 12 is a narrow line of the overall object 28, as shown by the example images 30a and 30b, shown in FIG. 2b. The image is digitized (if the output of the linescan camera 12 is analog) by the interface card. The computer 26 then forms an overall image by arranging each image from the linescan camera 12 in a file on the computer.

FIG. 3 illustrates a number of variables which can be selected by the user to control the path of the linescan camera 12 and to control how the overall image is formed in the computer 26. The segment field allows the user to provide different variables for multiple segments. Accordingly, a scan path can have different segments with different motion properties. The multiple segment ability also allows a complex path to be broken into multiple paths which are simpler to program.

The starting position of the scan is the position at which the computer 26 begins receiving images (after the ramp-up acceleration) from the linescan camera 12 to form the overall image. This variable could be set as a measurement from the either extreme of the track, in inches or millimeters. The segment length is the distance the linescan camera 12 travels in forming the overall image and could also be set in inches or millimeters. The carriage direction is the direction (right or left) in which the linescan camera will initially travel from the starting position. Alternatively, the segment could be defined as a starting position and an ending position, rather than by starting position, length and direction.

The carriage speed specifies the initial speed of the linescan camera 12, i.e., the speed of the camera at the starting point and could be set in term of inches/sec or millimeters/sec. The carriage acceleration defines an acceleration for the linescan camera 12 and could be set in terms of inches/sec$^2$ or millimeters/sec$^2$. For a constant velocity, the acceleration would be equal to zero throughout the segment. The carriage acceleration allows the speed of the linescan camera to increase or decrease during the segment scan.

The scan direction defines how the images from the linescan camera are arranged by the computer 26 to form the overall image. This is similar to the direction of the film advance in a film based panoramic camera. The scan rate defines how often image lines from the linescan camera 12 are sent to the computer 26 to form the overall image, and could be set in terms of image lines/sec. The scan rate acceleration allows the scan rate to change during the segment and could be set in terms of image lines/sec$^2$. A non-linear scan rate acceleration profile could also be programmed.

The overlap setting is one method to create an image which either overwrites a previous image or adds to a previous image. In other words, if the overlap setting is set to "overwrite", the scan will result in a new image. If the overlap setting is set to "add" the new image will be combined with a previous image, similar to a multiple exposure in a film based camera. However, in the case of a computer image, the new information received from the linescan camera 12 will be combined with existing information through averaging to produce the new image.

The Lens Magnification setting is available if the linescan camera 12 has a zoom lens. The Exposure Control setting is used to set the exposure for the linescan camera.

FIGS. 4 and 5 illustrate embodiments of the topological panorama camera 10 which provide greater flexibility in track configuration. In FIG. 4, an embodiment is shown where a side to support 32 is used support one end of the track in order to dispose the track 16 at an angle.

In FIG. 5, a curved track 16a is formed of interlocking pieces 16b to define a curved, or partially curved, path for the linescan camera 12. Interlocking pieces could be provided similar to those shown in U.S. Pat. No. 4,943,821 to Gelphman, issued Jul. 24,1990, which is incorporated by reference herein. Using a track 16 with different shaped track parts 16b would allow paths which had both curved and straight portions to create geometries described in greater detail hereinbelow. In this embodiment, the drive mechanism would more likely be incorporated into the carriage 14 rather than the track 16.

FIG. 6 illustrates a further possible modification to the carriage 14, which would allow the linescan camera 12 to be set at any angle through a joint 34 which allows tilt, pitch and roll, or a subset of these three degrees of freedom. The setting of the linescan camera angle could be performed manually, using a simple joint, or under computer control using a robotic joint. Using a robotic joint would allow the linescan camera angle to be changed during a scanning operation.

Figure 7:
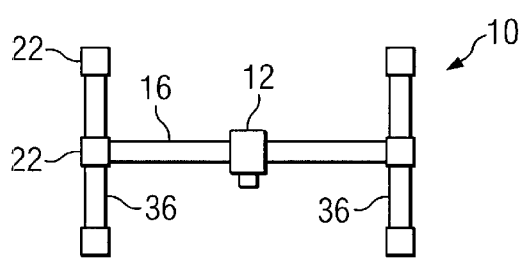
FIG. 7 illustrates a fourth embodiment of a topological panorama camera.

FIG. 7 illustrates an embodiment of the topological panorama camera 10 where the track 16 is supported by a second track 36, which allows the computer 26 to drive the track 16 forward and backward. Hence, the computer 26 can set a two dimensional path for the camera. Track 36 operates essentially the same as track 16, with the computer 26 controlling a second motor 22 associated with track 36 through controller 24.

Figure 8:
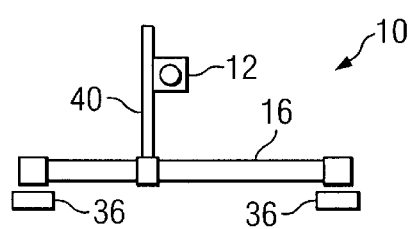
FIG. 8 illustrates a fifth embodiment of a topological panorama camera.

FIG. 8 illustrates an embodiment of the topological panorama camera 10 where a full three dimensional path can be realized. In this embodiment, a third track 40, which is vertically aligned is disposed between track 16 and carriage 14. The third track provides vertical motion to the linescan camera 12 under control of the computer 26.

Figure 9:
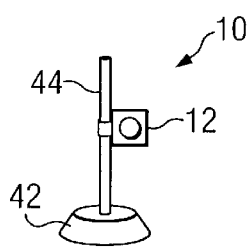
FIG. 9 illustrates a sixth embodiment of a topological panorama camera 10.

FIG. 9 illustrates an alternative embodiment of a topological panorama camera 10 with the capability to provide three dimensional paths for the line scan camera 12. This embodiment uses a robotic base 42 which can move in two dimensions over a flat surface, such as a floor or a table. An elevator 44 is disposed on the robotic base 42 to raise and lower the linescan camera 12. The computer 26 can control the robotic base 42, elevator 44 and linescan camera 12 through either a wired or a wireless connection. Alternatively, the computer 26 can be built into the robotic base.

The three dimensional topological panorama camera 10 of FIG. 9 is not constrained by the dimensions of tracks 16 and 36 as shown in FIGS. 7 and 8. Therefore, this embodiment can provide paths of any length, and also provide paths encircling an object, which would not be possible with the topological panorama cameras 10 of FIGS. 7 and 8. This embodiment could also use a robotic joint to mount the linescan camera 12 as described in connection with FIG. 6.

In addition to the path of a scan, the image is also affected by the movement of the object. Accordingly, mechanisms similar to those described for movement of the linescan camera 12, could be used to move the object of the scan as well. Other methods of movement of the object, such as setting the object on a turntable or swinging as a pendulum could also be employed.

The topological panorama camera 10 records images of an object through a line, i.e. the CCD linear array, which continuously moves relative to an object. As a result, the images of an object may be quite different from the human perception of the object which is a momentary, three dimensional perspective perception of space and time.

One use for the topological panorama camera 10 is in education. An important way in which the topological panorama camera 10 can be used to enhance a students knowledge of geometry is to use the topological panorama camera 10 to create shapes or predict a shape.

Figure 10:
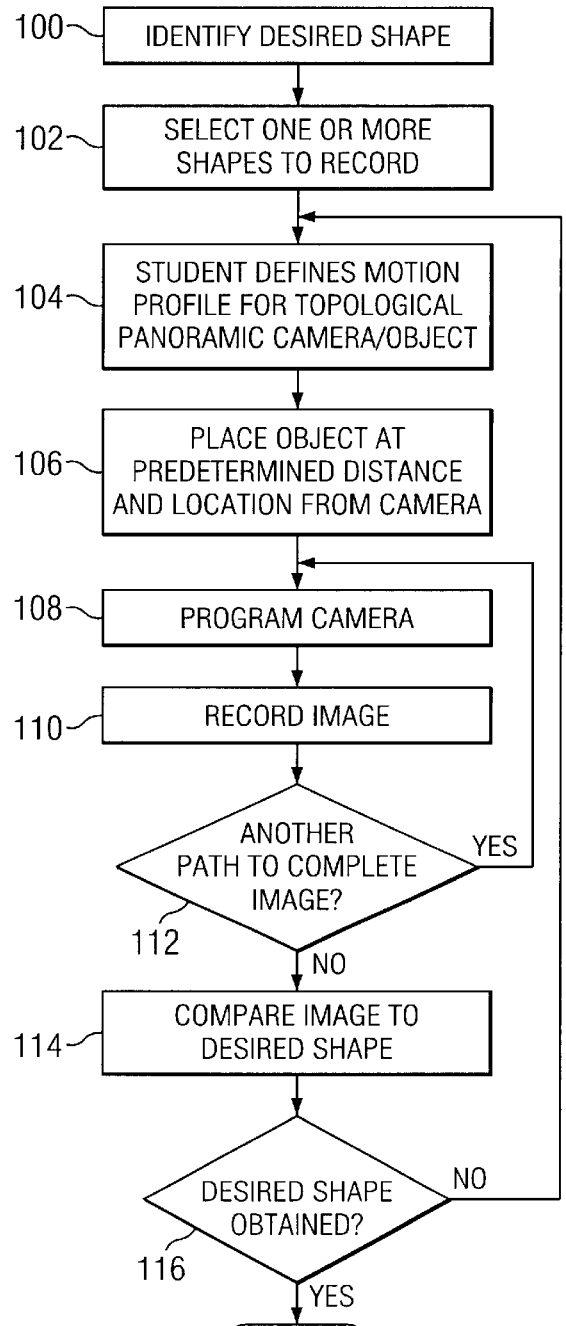
FIG. 10 illustrates a flow chart describing a method for using the topological panorama camera to enhance learning of geometry.

FIG. 10 illustrates a flow chart describing a method for teaching in which a student generates a desired shape by making an image of a predetermined object (for example, a piece of cardboard with a square drawn on it, a ball, or a ruler) using the topological panorama camera 10 to record an image using one or more scans.

In step 100, the desired shape is identified. As an example, the teacher may choose an equilateral triangle as the desired shape. In step 102, one or more objects are selected for use in making an image displaying the desired shape. For instance, a piece of cardboard with a straight line could be used to make the image of the equilateral triangle (the desired shape).

In step 104, the student determines a motion profile of the relative movements between the object and the camera needed to produce the image of the desired shape. The motion profile for the topological panorama camera 10 may include a combination of: (1) starting position, (2) length of scan operation, (3) carriage direction, (4) carriage speed, (5) carriage acceleration (linear and non-linear), (6) scan direction, (7) scan rate and (8) scan rate acceleration (linear and on-linear). Similarly, the position, movement speed, direction, and acceleration of the object can be considered.

Once the motion profile is determined, the object is placed in front of the topological panorama camera 10 at a predetermined location in step 106 and the camera is programmed for a first path in step 108. The image is then recorded in step 110; if an object motion is being used, the object is placed in motion and synchronized with the topological panorama camera 10 prior to starting the image. After recording, if additional paths are necessary to complete the image of the desired shape in decision block 112, steps 108 and 110 are repeated; otherwise, the resulting image is compared to the desired shape in block 114.

If the desired shape is obtained in decision block 116, then the assignment is done. Otherwise, the student rethinks the motion profile and begins the recording process again.

By predicting the outcome of a motion profile and comparing it with the actual result, a student enhances his problem solving abilities, spatial visualization, critical thinking skills, capabilities to analyze new knowledge and new information, and creative and divergent thinking skills. Even when a student incorrectly predicts a motion profile for generating the desired shape, discovering why the predicted motion profile resulted in a different-than-expected image is instructive in itself.

Below, a number of examples describing how the topological panorama camera 10 can be:used to create different shapes are set forth.

Creating a Euclidean Geometry

Figure 11A:
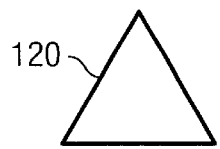
FIGS. 11a through 11f illustrate an example of the method of FIG. 10 using a line segment to generate an image of a triangle.
Figure 11B:
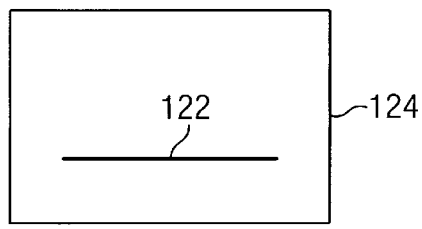
Figure 11C:
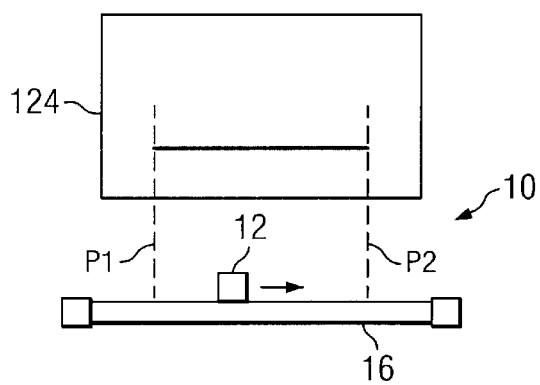

FIGS. 11a–f illustrate a first method of creating a triangle (the desired shape) with a line segment (the selected shape). FIG. 11a illustrates the desired shape 120, an equilateral triangle. FIG. 11b illustrates the selected shape 122, a line segment, drawn on a sheet of material 124. In FIG. 11c, the linescan camera 12 scans the selected shape in a scan path defined by P1 and P2, at a predetermined constant speed and predetermined constant scan rate, with the scan direction the same as the carriage direction.

Figure 11D:
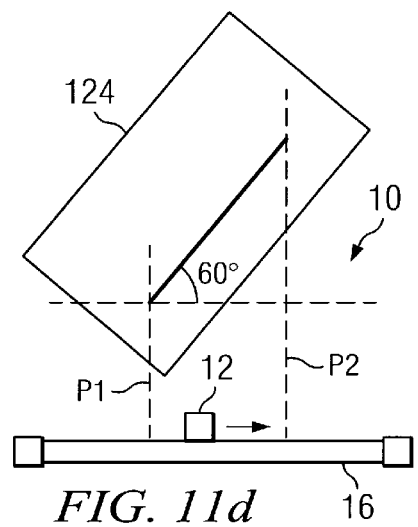

In FIG. 11d, the object 124 is rotated sixty degrees and a second scan path is defined (with the overlap setting set to "add") using the same settings as in FIG. 11c, although the distance of the scan would be shorter, as shown by points P1 and P2 in FIG. 11d.

Figure 11E:
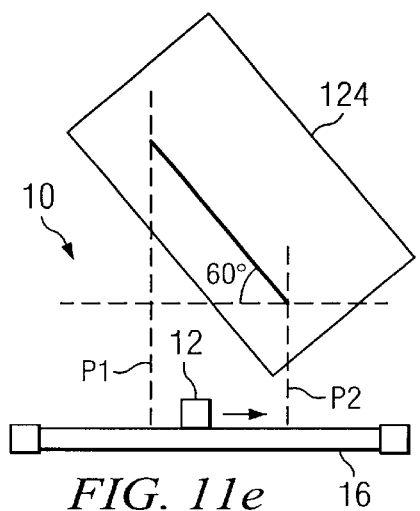

In FIG. 11e, the object is rotated such that line segment 122 lies sixty degrees from parallel, in the opposite direction from that of FIG. 11d. A third scan is made with the same settings as those in FIG. 11d.

Figure 11F:
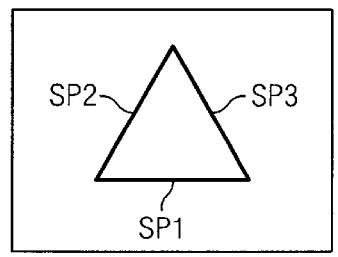

The resultant equilateral triangle is shown in FIG. 11f. Segment SP1 was formed by the scan path described in conjunction with FIG. 11c, segment SP2 was formed by the scan path described in conjunction with FIG. 11d, and segment SP3 was formed by the scan path described in conjunction with FIG. 11e.

Figure 12A:
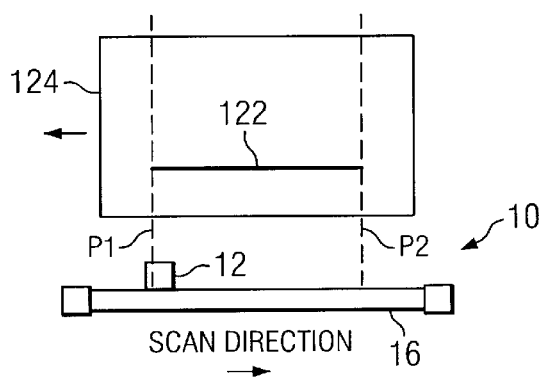
FIGS. 12a through 12d illustrate a second example of the method of FIG. 10 using a line segment to generate an image of a triangle.

FIGS. 12a–d illustrate a second method which could be used to generate an image of an equilateral triangle 120 from a line segment 122. The first scan path used to form the triangle is shown in FIG. 12a. Rather than move the camera 12, as shown in FIG. 11c, the object is moved to the left at a predetermined constant speed with the linescan camera 12 still.

Figure 12B:
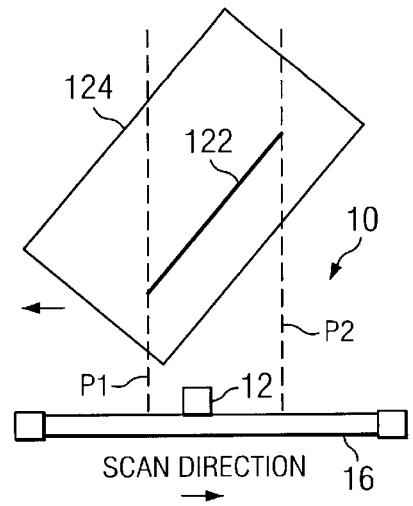
Figure 12C:
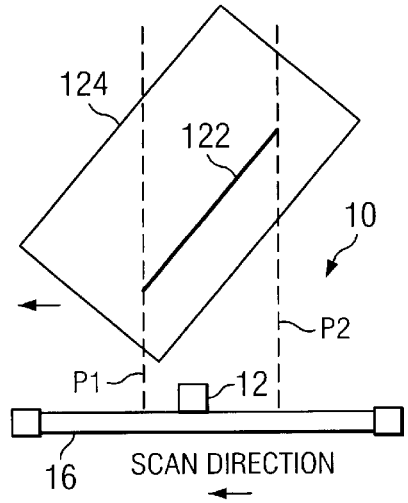

In FIG. 12b, the card is turned sixty degrees and a second scan path is made by moving the card to the left with the linescan camera still. In FIG. 12c, the same scan path as in FIG. 12b is used, moving the object 124 to the left; however, in this case the scan direction (the order in which scan lines are arranged to form an image) is reversed. An alternative method to form the final line segment would be to move the object 124 to the right while maintaining the scan direction in the same direction as in FIG. 12b.

Figure 12D:
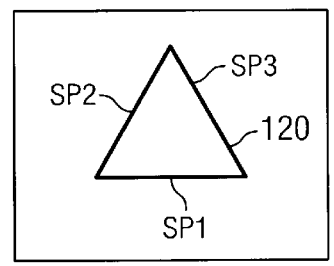

The resultant image is shown in FIG. 12d.

FIGS. 13a–e illustrate another example of creating a geometric shape, where a selected shape, a right triangle 130 drawn on a flat object 132 (shown in FIG. 13a), is used to create a similar triangle 134 (shown in FIG. 13b) being rotated by 90 degrees. Right triangle 130 has three angles, A, B and C. The desired shape also has angles substantially equal to A, B, and C (labeled A', B' and C', respectively). The problem is to use the topological panorama camera 10 to generate the desired shape 134 without rotating either the object 132 or the topological panorama camera 10.

Figure 13A:
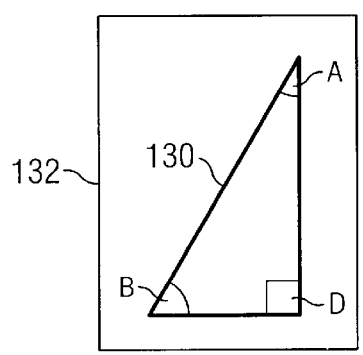
FIGS. 13a through 13e illustrate an example of the method of FIG. 10 to generate a congruent right angle.
Figure 13B:
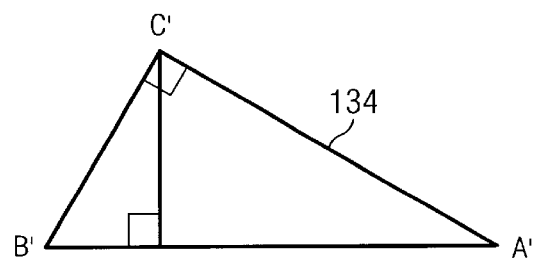
Figure 13C:
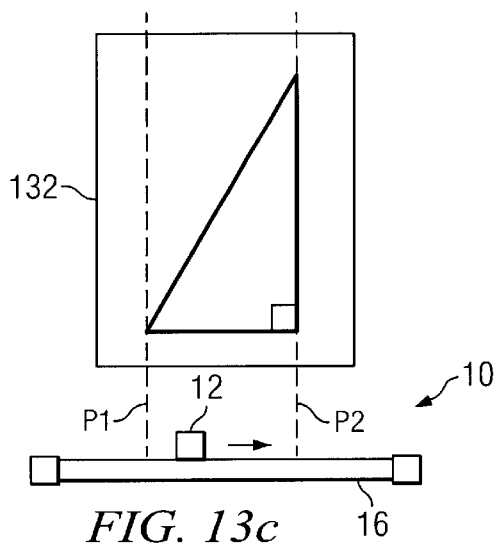
Figure 13D:
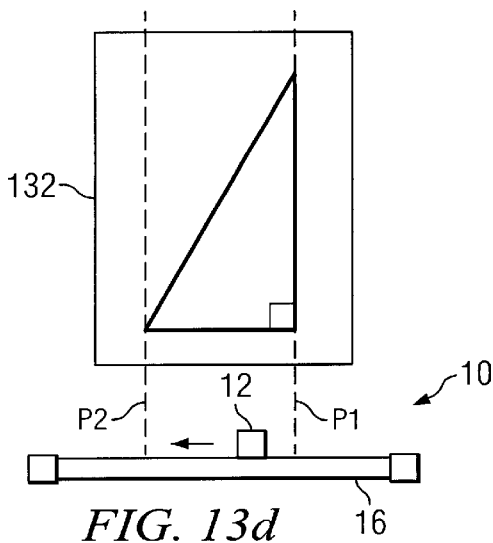
Figure 13E:
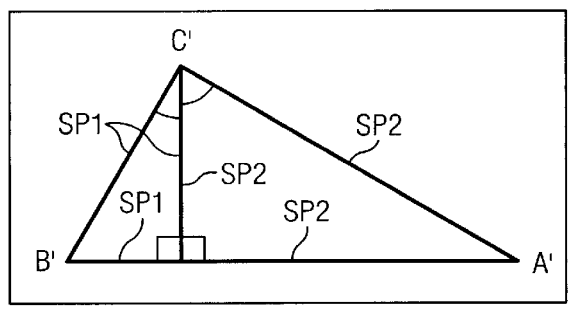

The solution is shown in FIGS. 13c–e. In FIG. 13c, a path from P1 to P2 is defined at a predetermined carriage velocity, for example 10 inches/sec. After completing this scan path, a reverse scan path is defined (as shown by the opposite orientation of P1 and P2 in FIGS. 13c and 13d) at a slower speed, for example 2.2 inches/second.

As shown in FIG. 13e, the resulting image comprises two triangles mated along a common side. The first triangle SP1, resulting from the first scan path, is essentially the same as the sample shape. This is a result of choosing a carriage speed and scan rate which does not horizontally stretch or compress the object. The second triangle SP2, resulting from the second scan path, is a stretched mirror image of the sample shape 130. Triangle SP2 is horizontally stretched because of the slower carriage speed and is a mirror image because the direction of the linescan camera 12 is reversed during the second scan path relative to the first scan path.

The examples shown in FIGS. 11–13 describe creating a geometry which follows the rules of a Euclidean Geometry. Using the topological panorama camera 10, an image that follows the rules for a Euclidean geometry is created when the camera moves relative to an object in a plane that is parallel or at an angle to an object. For example, a shape, such as a triangle, which is imaged in a scan path which is in a plane parallel or at an angle to the linescan camera 12 will retain some of the properties of a Euclidean space. For example, the angles of the imaged triangle will always add up to 180 degrees (as shown in FIGS. 13a–e). Changes in the image shape due to changes in speed, direction or distance from the camera, preserve the Euclidean perspective displayed in the geometry of the created image.

Creating a Non-Euclidean Geometry

Figure 16A:
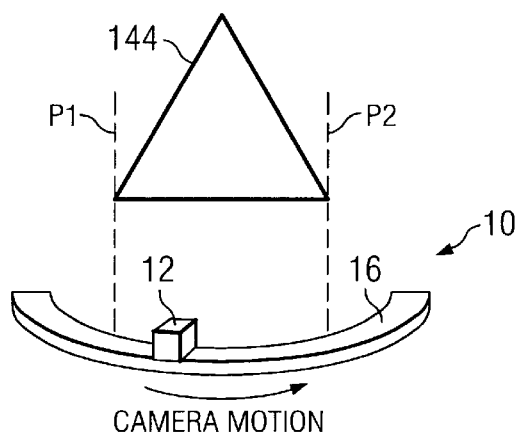
FIGS 16a and 16b illustrate a method of generating a non-Euclidean shape from a Euclidean shape.
Figure 16B:
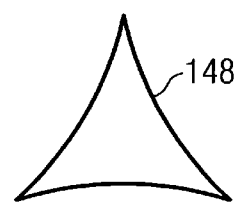
Figure 17A:
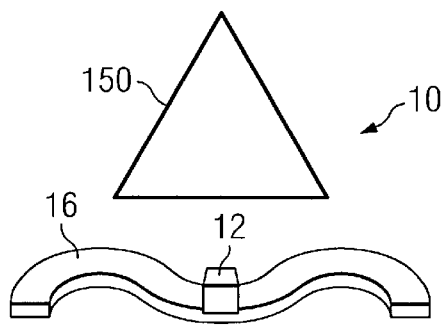
FIGS. 17a and 17b illustrate a method of generating a topological shape from a Euclidean shape.
Figure 17B:
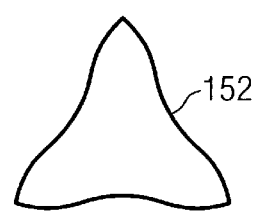

A non-Euclidean geometry is generated when the linescan camera moves in a predetermined path of a hyperbolic curve (a constant negative curvature) or a spherical curve (a constant positive curve). All images created in this manner follow the postulates of a non-Euclidean geometry. For example, in FIG. 15a, the linescan camera 12 is mounted on a spherically curved track 15. The object 144, an equilateral triangle, lies on a plane in front of the track. The resulting image is a spherical triangle 146, which has the sum of its angles greater than 180 degrees. Conversely, if the relatives movement between the linescan camera and the object 144 is on a constant negative curvature as shown in FIG. 16a, the image would be that of a hyperbolic triangle 148, shown in FIG. 16b, which has angles with a sum of less than 180 degrees.

Using the topological panorama camera 10, a student can create a non-Euclidean shape from a Euclidean shape, such as a line segment (using a process similar to that shown in FIGS. 11a–f or FIGS. 12a–e) or closed object such as a triangle or square.

Creating a Topological Geometry

Another type of geometry which can be created using relative motion with the topological panorama camera 10 is a topological geometry. Traditional study of topology studies the homeomorphism—the spatial equivalences other than those of size and shape, as described in *A Child's Conception of Space*, Piaget and Inhelder (1948). Such a geometry does not distinguish between circles, ellipses, or polygons, nor between cubes and spheres, but between, for example, a sphere and a torus.

A topological geometry is created by a predetermined motion when the linescan camera 12 moves in a "topological motion", traveling in any continuous path in motion or space relative to an object. This produces a continuous deformation of the object in the resultant image. For example, in FIG. 17, equilateral triangle 150 is deformed into image 152 when the scanning device travels in a path of a one dimensional manifold. A similar result would occur if the line scan camera traveled with non-linear acceleration.

Method to Change the Extrinsic Geometry of an Object Through Relative Motion

Figure 18A:
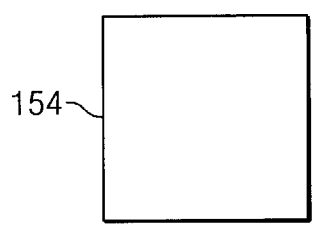
FIGS. 18a and 18b demonstrate the difference between extrinsic and intrinsic properties of an object.
Figure 18B:
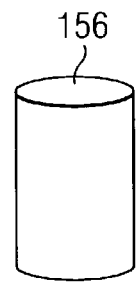

FIG. 18 illustrates an important aspect of geometry, the differentiation of intrinsic and extrinsic properties. FIG. 18a illustrates a flat piece of paper. When rolled into a cylinder 156, as shown in FIG. 18b, the extrinsic property of the shape has changed—the paper is now embedded in three dimensional space. However, the intrinsic properties of the paper, its internal structure, has not deformed.

Figure 19A:
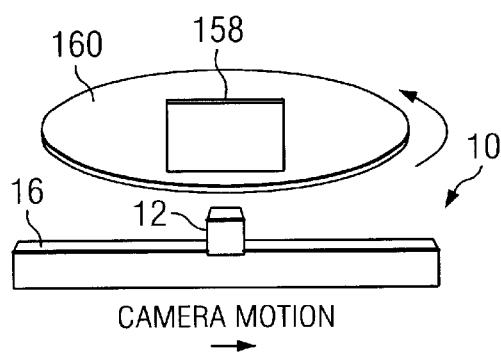
FIGS. 19a, 19b and 19c illustrate a method to change the extrinsic property of an object through relative motion.
Figure 19B:
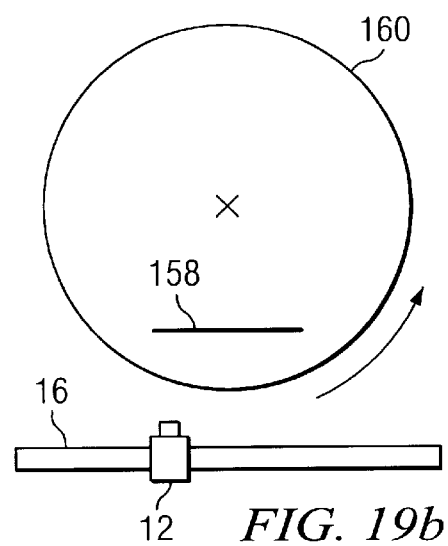

The topological panorama camera 10 can be used to derive images which change the extrinsic properties of an object, while not changing the intrinsic properties. FIGS. 19a–b illustrate front and top views of an object 158, a flat rectangular object located on the edge of a rotating turntable 160. As the turntable rotates, an image is recorded using a topological panorama camera 10 having a straight track 16. The turntable is synchronized with the linescan camera such that the entire object 158 passes in front of the linescan camera 12 during the image scan. The two relative motions, the spinning of the flat object on the turntable and the linear path of the linescan camera 12 result in the image 162 shown in FIG. 19c. The image 162 has the shape of a surface of a cylinder.

The horizontal lines of the object 158 appear curved in the image 162 due to a constant change of the object's location relative to the camera 12 during the scan. When the linescan camera travels with a constant speed on a linear path, an object's image size in the direction of motion (horizontal dimension) stays fixed regardless of its distance from the camera, as described in U.S. Pat. No. 4,943,821 to Gelplman referenced above. This is referred to as "Fixed X" perspective herein. The vertical dimension appears as expected in a normal, linear perspective due to the physics of lenses—the size of the object diminishes or increases proportionally as the object moves farther away from or closer to the camera. In FIG. 19, the horizontal lines are curved because the object's curvilinear motion produces a constantly changing vertical dimension relative to the camera's linear motion. The once rectangular card, embedded in a flat Euclidean space, thus appears with a different extrinsic geometry, a cylindrical surface, as a result of the relative motions of the rotating square and linear path of the linescan camera 12.

Method to Change the Intrinsic Geometry of an Object Through Relative Motion

Figure 20A:
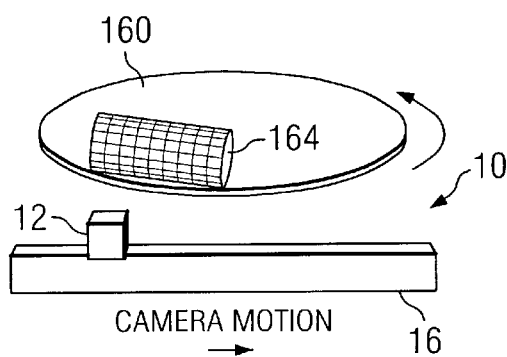
FIGS. 20a and 20b illustrate a method to change the intrinsic property of an object through relative motion.
Figure 20B:
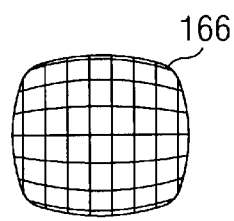

FIGS. 20a–b illustrate the use of relative motion between the linescan camera 12 and an object which changes the intrinsic geometry of an object. In FIG. 20a, a cylinder 164 (open surface) is rotated on turntable 160. The horizontal measurement of the cylinder's curved vertical lines stays fixed, as described above, preserving the vertical lines curvature. The straight horizontal lines of the cylinder 164 become curved as a result of the object's rotational motion. As seen in FIG. 20b, the resulting image 166 appears as a closed spherical surface. Since a cylinder cannot change into a sphere without deformation of the object, its intrinsic geometry is changed by the scan operation.

Figure 21A:
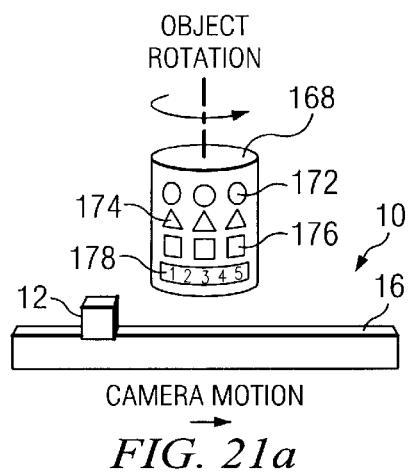
FIGS. 21a and 21b illustrate a method to create an image with two extrinsic geometries.
Figure 21B:
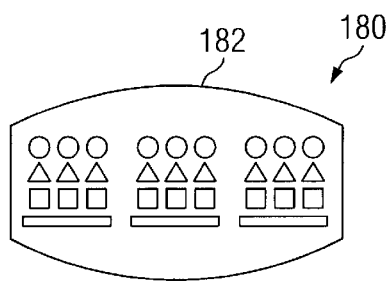

Method to Create an Image With Two Extrinsic Geometries Using Three Relative Motions In FIG. 21a, a cylindrical object 168 (formed of a sheet of paper with circles 170, triangles 172, squares 174 and an eight inch ruler 178) is rotated relative to the linescan camera 12. The rotation rate is much faster than the movement of the camera's velocity and the scan rate is much higher than the camera movement. As shown in FIG. 21b, the resulting image 180 has two extrinsic images. The first extrinsic image is one of a cylinder 182 as the horizontal edges of the paper curve as expected and produce a cylindrical shape embedded in three dimensional Euclidean space. The second extrinsic shape is that of the ruler 178, circles 172, triangles 174 and squares 176, which appear flat and embedded in a planar Euclidean space.

The unique spatial appearance is a result of three relative motions: the rotation of the object 168, the movement of the linescan camera 12 and the camera's scan rate. As the object rotates, the camera remains effectively stationary, while recording an image of the ruler 178, circles 172, triangles 174 and squares 176. Since the camera remains essentially stationary during the recording of the shapes on the cylinder, the view from the camera's line of reference does not change and thus does not record the constant change of direction and location of the rotating vertical dimension. Thus, the appearance of the ruler 178, circles 172, triangles 174 and squares 176 appears flat and planar as one would expect from a rotation of the cylinder 168 with a stationary camera 12. As the scan is completed, the horizontal edges of the cylinder 168 appear curved in the image as shown by cylindrical shape 182. Thus the resulting image has two extrinsic geometries, the planar extrinsic properties of the internal shapes and the cylindrical, three dimensional appearance of the edges of the image.

Figure 22A:
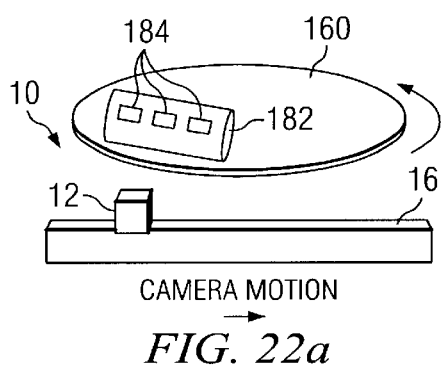
FIGS. 22a and 22b illustrate a method to create an image with two intrinsic geometries.
Figure 22B:
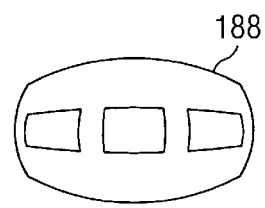

Method to Create an Image With Two Intrinsic Geometries Using Three Relative Motions The intersection of three relative motions with an original object forms an image having two intrinsic geometries. In FIG. 22*a*, a cylinder 182 formed of a sheet of paper having three squares 184 is rotated lengthwise on the edge of turntable 160. The rotational rate of the turntable is much faster than the movement of the camera's velocity and the scan rate is much higher than the camera movement. This combines the motions of FIG. 20 with the motion of FIG. 21. The resulting image 188, shown in FIG. 22*b*, has two distinct, intrinsic geometries. The portion of the image 188 created from the edges of the cylinder 182 is an elliptical surface embedded in a non-Euclidean geometry (closed) and the portion of the image created from the squares 184 is a cylindrical surface, embedded in a three dimensional Euclidean geometry (open).

Figure 23A:
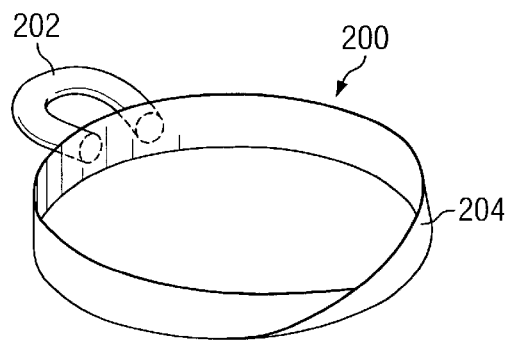
FIGS. 23a, 23b and 23c illustrate a method to create a figure composed of connected sums through relative motion.

Method to Create Figures in an Image that are Connected Sums from Relative Motions FIG. 23*a* illustrates an example of an object 200 which is the connected sum of a torus 202 and a Mobius strip 204. The procedure in traditional mathematics for creating such a figure is to "cut" a disk out of each sub-object and "glue" the edges together forming a new shape that is the "sum" of the two sub-objects together.

Figure 23B:
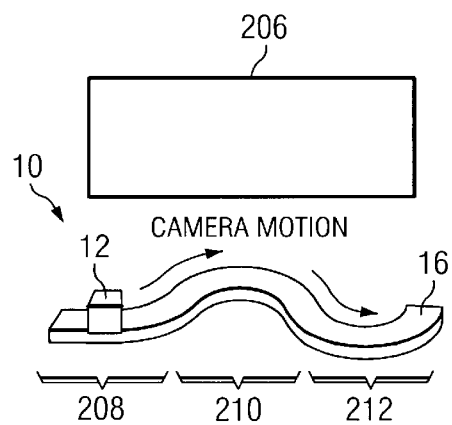
Figure 23C:
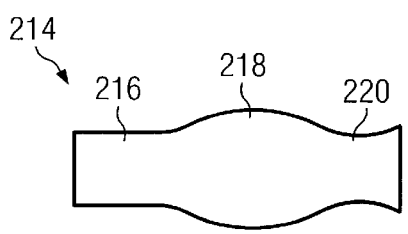

Using the topological panorama camera 10, the geometry of relative motion can create an image with shapes that are the "sum" of the relative motions. In FIG. 23*b*, an object 206, a flat plane such as a rectangle is scanned in a scan path which starts as a straight path 208 parallel to the objects, then changes to a positive curve path 210 and ends in a negative curve path 212. The resulting image 214 is shown in FIG. 23*c*, which shows a plane 216, connected to a cylinder 218 connected to a polygon 220 with two hyperbolic edges.

Method to Create an Image Which is a Product of an Object and Relative Motion

Figure 24A:
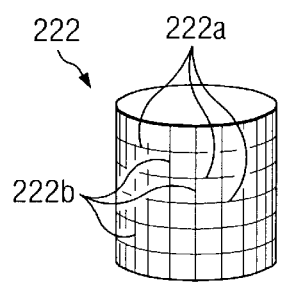
FIGS. 24a, 24b and 24c illustrate a method to create an image which is a product of an object and relative motion.

A cylinder 222 can be defined in traditional geometry as the product of a circle 222*a* and an interval 222*b*, as shown in FIG. 24*a*, where an interval is a line segment with both endpoints included.

Figure 19C:
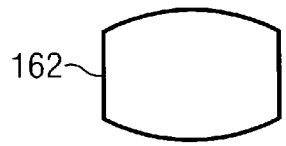
Figure 24B:
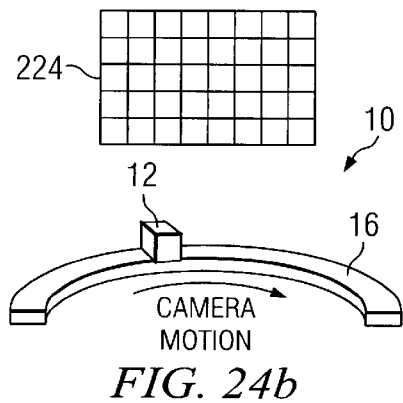
Figure 24C:
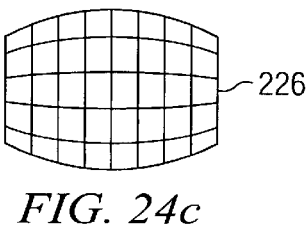

The topological panorama camera 10 can be used to generate a product. As shown in FIG. 24*b*, a cylindrical image can be produced as the product of an interval, the object 224, and the circular relative motion between the object and the linescan camera 12. The circular relative motion can be the linescan camera 12 moving while the object remains still, as shown in FIG. 24*b*, or the object rotating as the linescan camera 12 moves along a linear path (as shown in FIGS. 19*a–c*), or a combination of both. The resulting image 226 is shown in FIG. 24*c*.

Method to Compute the Euler's Number For a Surface Using the Geometry of Relative Motion The Euler number for a surface can be determined through relative motion. The Euler number describes the curvature of a surface—Euclidean, elliptical or hyperbolic, in terms of positive curvature (elliptical), zero curvature (Euclidean), or negative curvature (hyperbolic). *Shape of Space, How to Visualize Surfaces and Three Dimensional Manifolds*, by Jeffery Weeks (Marcel Dekker, Inc. 1985), incorporated by reference herein, describes a method of finding the Euler number for a surface in a spatial geometry.

The topological panorama camera 10 can also determine the Euler number of an object's surface using relative motion. The method can find an unknown curvature or Euler number of an object's surface using relative motion between the linescan camera 12 and the object and the curvature found in the resultant image.

Figure 25B:
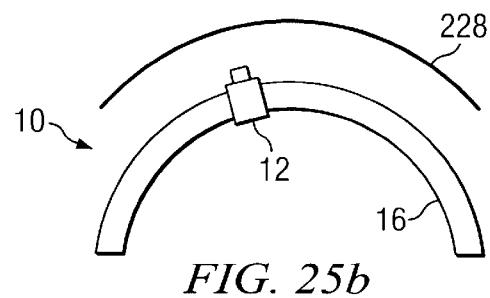
FIGS. 25a, 25b and 25c illustrate a method to determine Euler's number for an unknown object or path using relative motion.
Figure 25A:
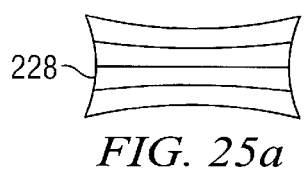
Figure 25C:
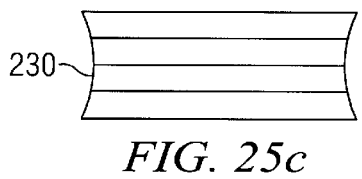
Figure 26A:
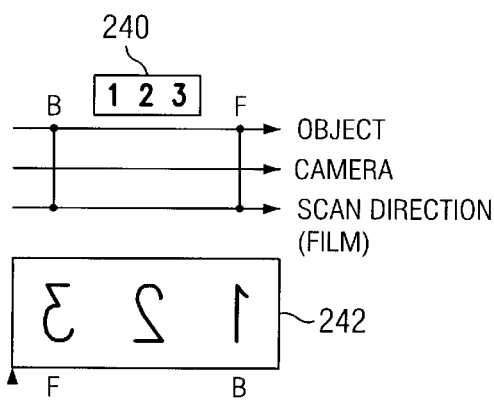
FIGS. 26a through 26f illustrate a method to generate an orientation of an image based on object, camera and scan directions where the object moves faster than the linescan camera.
Figure 26B:
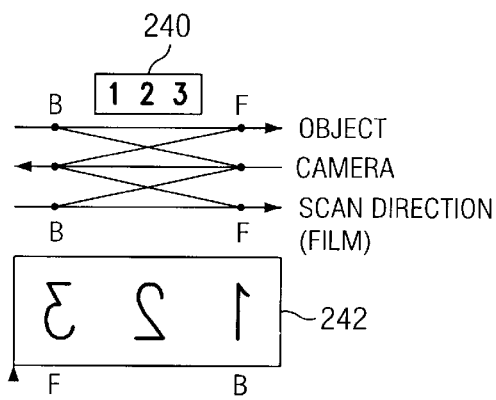
Figure 26C:
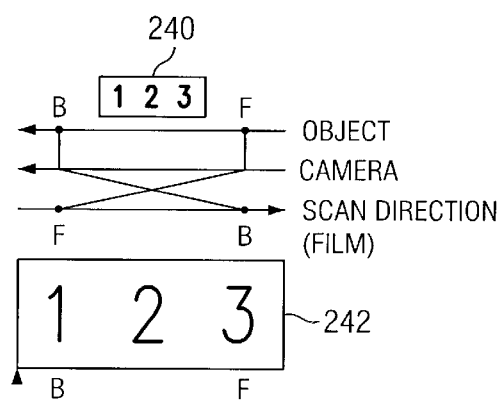
Figure 26D:
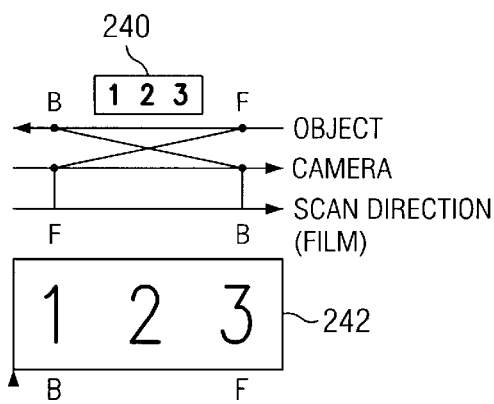
Figure 26E:
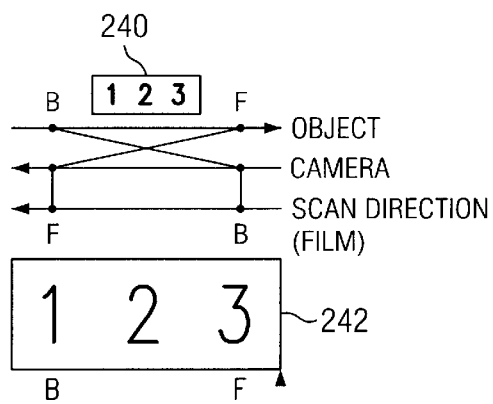
Figure 26F:
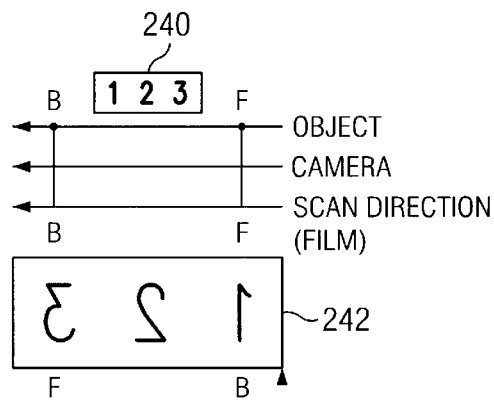
Figure 27A:
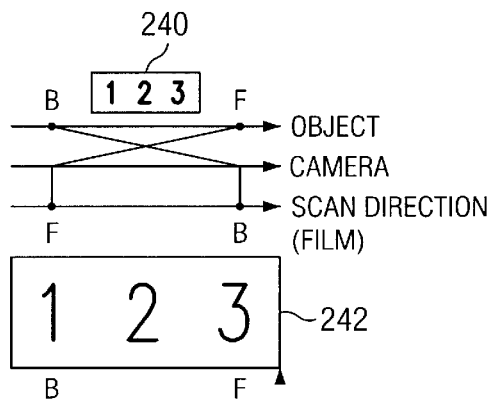
FIGS. 27a through 27f illustrate a method to generate an orientation of an image based on object, camera and scan directions where the object moves slower than the linescan camera.
Figure 27B:
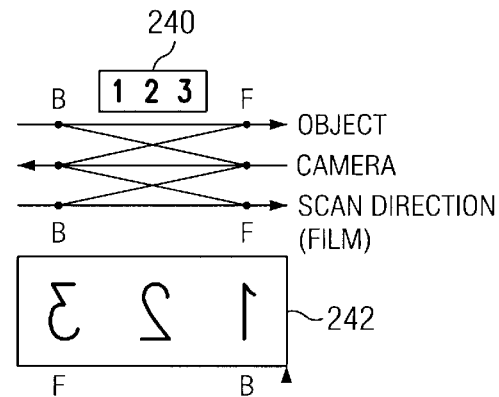
Figure 27C:
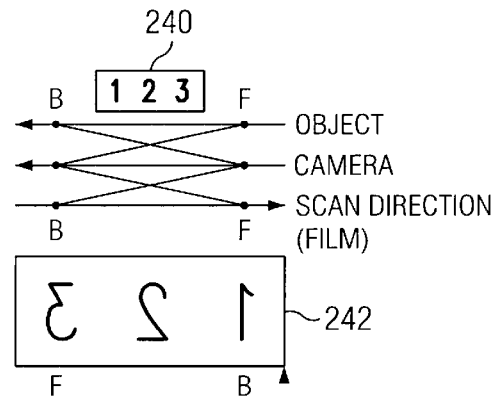
Figure 27D:
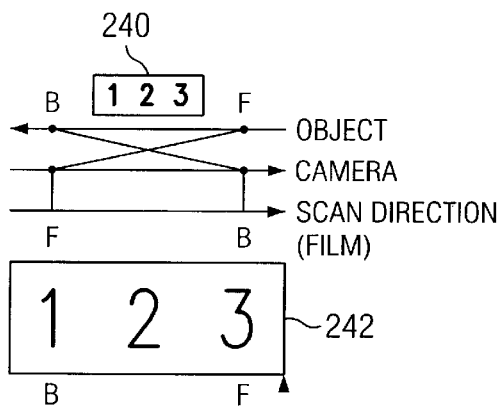
Figure 27E:
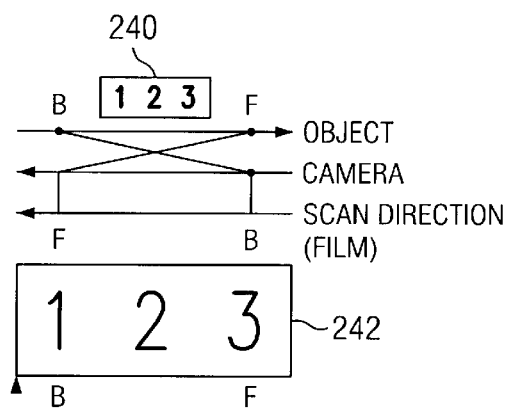
Figure 27F:
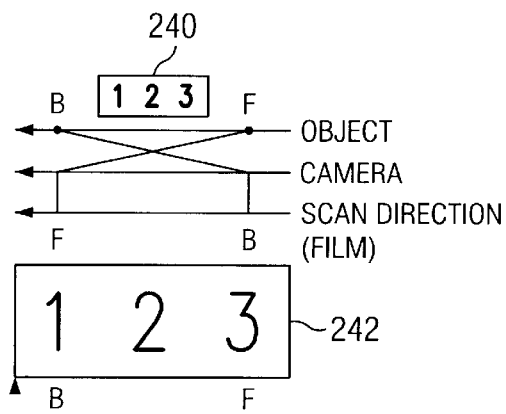

To describe the method of determining Euler's number for an object of unknown shape, a hyperbolic polygon 228 is shown in FIGS. 25*a* and 25*b*. In FIG. 25*b*, the path of the linescan camera 12, which is known, is a positive curve. The resulting image, shown in FIG. 25*c*, shows flat lines, i.e., a zero curvature. An additive and subtractive relationship exists between the object's surface, the path of the camera, and the resultant image. If the curvature of the surface (−1 in this example) is added to the curvature of the camera's motion (+1 in this example), the result will be the curvature shown in the image. Hence, curvature(image)−curvature (path)=curvature of object. Thus, knowledge of any two curvatures can reveal the unknown curvature. Thus, in the example, the curvature of the object can be derived by the known curvature of the image (0) less the known curvature of the path,(+1).

In addition to academic uses, this property can be used in machine vision to recognize shapes and curvatures of surfaces. By knowing the path, the resulting image can be used to determine the curvature of the surface of an object encountered by a robot or other machinery.

Method to Create Different Orientations of an Object in an Image Using Three Relate Motions Orientation is the position of a geometric figure relative to a coordinate system; especially the sense of a directed line. A surface is orientable in the sense that a consistent direction can be given to points of the surface by triangulation. Equivalently, the surface contains no Mobius strip, so that one cannot move a small oriented circle on the surface in such a way that it returns to initial position. A surface, such as a Mobius Strip or Klein bottle, that cannot be given such an orientation, is non-orientable.

In U.S. Pat. No. 4,043,821, referenced above, a method is described to create an image that has a non-orientable surface. In FIGS. 6*a–b* of that patent, a folded, non-orientable image is created when the camera's path is parallel to the subject and midway through the subject, the film direction changes from forward to reverse. A reverse image is generated by moving the film backwards relative to the camera's motion. Hence, the mirror image of the subject is folded over onto the previously recorded image (normal orientation) and generates a non-orientable surface.

An image with two different orientations can also be generated by the topological panorama camera 10 through the intersection of three relative motions—camera motion, object motion and scan rate motion. FIGS. 26*a–f* illustrate methods where the object is moving faster than the camera 12 and FIGS. 27*a–f* illustrate methods where the camera 12 is moving faster than the object.

In FIGS. 26*a–f*, the object 240 (a flat board with the numbers"123") is moving faster relative to the camera's motion producing different orientations in the images 242. In these Figures, the object and image are labeled F (front) and B (back) as if the front is the front of a car and the back is the back of a car from a side view. Each lie represents one relative motion and the arrow represents the direction of motion. For example, in FIG. 26*a*, the object, camera and "film" (i.e., the scan direction) are all in the same direction. In a left film direction, the image builds from left to right and for a right film direction, the image builds from right to left. The starting side of the image build is indicated by a small triangle on each image 242. Vertical lines and diagonals represent the path of a point from the object to the image.

In FIGS. 26a–f, the object will always appear backward in the image when the object direction and the scan direction are the same. When the object direction and scan direction are opposites, the object will always appear with normal orientation, independent of the camera's direction.

In FIGS. 27a–f, the camera is moving faster than the object's relative motion, producing different orientations in the images. An object will always appear backwards when the camera direction and scan direction are opposites. When the camera direction and scan direction are the same, the object will always appear normal, independent of the object's direction.

Accordingly, one can predict an object's orientation by knowing the relative speeds and directions of the object, camera and film. Changing the scan rate does not change orientation, it only expands or contracts the object's size in the image.

One can also predict an unknown direction of the camera for conditions shown in FIGS. 26a–f by inserting a stationary ruler into the scene to be imaged. Inserting a stationary ruler will predict the camera's direction of motion because the stationary ruler will always reflect the relationship between the camera and film—appearing backward or forward according to the scan direction and camera direction. If the camera is moving in an opposite direction as to the object and film, a stationary ruler will appear backwards. However, without additional information, one cannot predict the unknown direction of the object under the conditions of FIGS. 27a–f, because the object's orientation in the image relative to a stationary ruler is not predictive of its direction of motion.

Figure 28A:
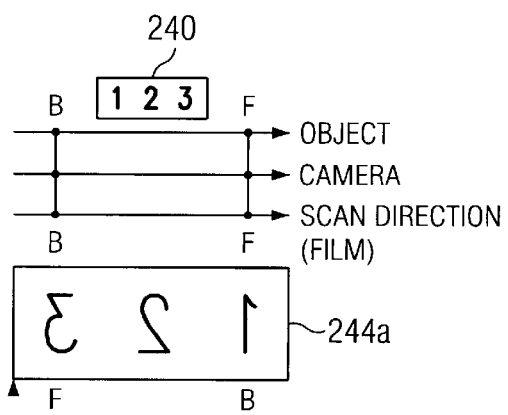
FIGS. 28a and 28b illustrate a method to create a non-orientable surface from an orientable object with relative motion.
Figure 28B:
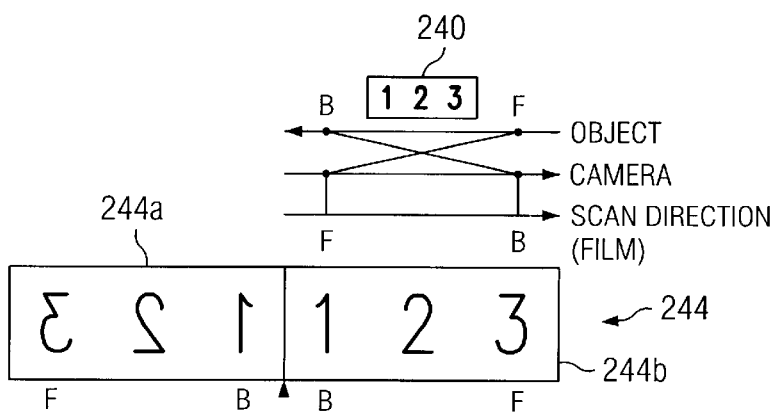

In FIGS. 28a–b, four different relative motions generate a non-orientable surface in the image from an orientable object. In FIG. 28a, which shows the first segment, the object 240 is moving faster than the camera. The object, camera, and scan directions are all to the left, thereby creating segment image 244 a of image 244. In FIG. 28b, showing a second segment, the object 240 reverses direction, thereby creating segment image 244b of image 244. The overall image 244, becomes a non-orientable surface.

Figure 29A:
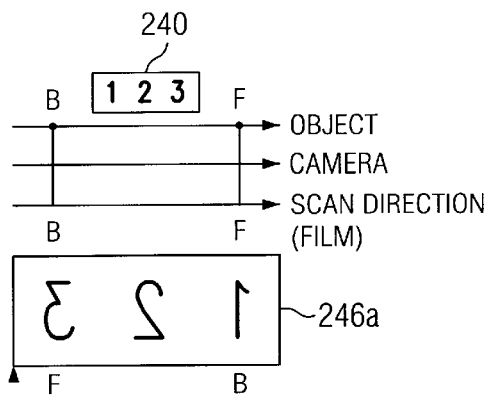
FIGS. 29a and 29b illustrate a method to maintain an orientable surface from an orientable object with relative motion.
Figure 29B:
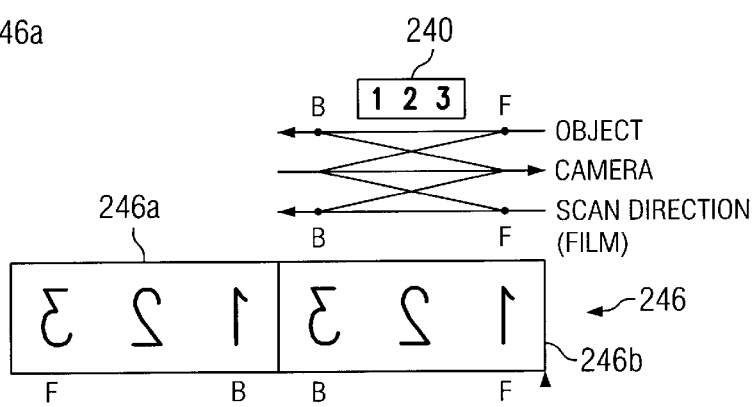

In FIGS. 29a–b, a surface is kept orientable through five relative motions and two changes in direction. In FIG. 29a, which shows the first segment of path motion, the object 240 is moving faster than the camera. The object, camera and scan directions are all to the left, thereby creating segment image 246a of image 246. In FIG. 729b, showing a second segment, the object 240 reverses direction as does the scan direction, thereby creating segment image 246b of image 246. The overall image 246, is an orientable surface.

Figure 30A:
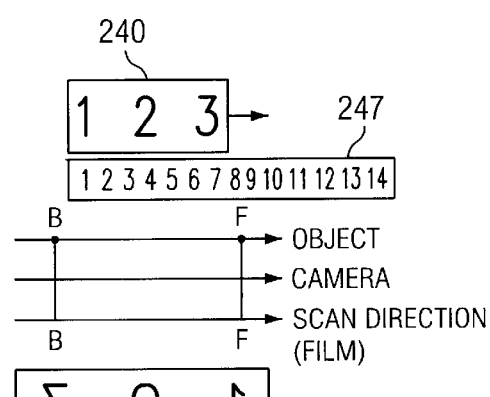
FIGS. 30a and 30b illustrate a method to create an image of one orientable surface and one non-orientable surface.
Figure 30B:
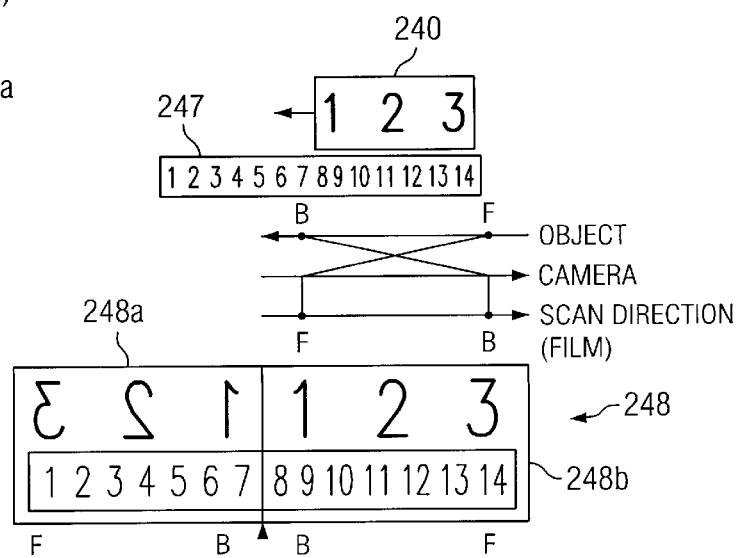

In FIG. 30, a method is shown to create one orientable surface and one non-orientable surface in one image through three relative motions and one change in direction. In FIG. 30a, which shows the first segment of path motion, the object 240 is moving faster than the camera. A stationary ruler is placed below object 240. The object, camera and scan directions are all to the left, thereby creating segment image 248a of image 248. In FIG. 29b, showing a second segment, the object 240 reverses direction, thereby creating segment image 248b of image 248. The overall image 248, has an image of the moving object 240, which is an non-orientable surface, and an image of the ruler, which is an orientable surface.

Method to Create a Physical Representation of a Calculus Equation

Newton developed Calculus to measure and define motion. He regarded the plane curve as the path traced out by a moving point during an infinitely small interval. He was able to formulate a mathematical method, Calculus, to describe this phenomena. The technique described below illustrates a method, using relative motion and the topological panorama camera 10, to create a physical representation, an image, of a Calculus equation.

Calculus mathematically describes complex motions, geometries of surfaces, and changes in rates of physical processes. A line scan camera's moving line of pixels creates images of complex relative motion geometries, as described above, and rates of change. By employing a line scan camera with relative motion, this method mechanically mimics the essence of Calculus by moving an infinitely small interval (a line rather than a point) through spacetime in a predetermined motion. In essence, both systems, the Calculus and the topological panorama camera 10 and relative motion, describe motion. The latter makes motion visible and measurable. Thus, this technique described herein, can be a very useful tool for students comprehension of the mathematics of calculus.

Figure 14A:
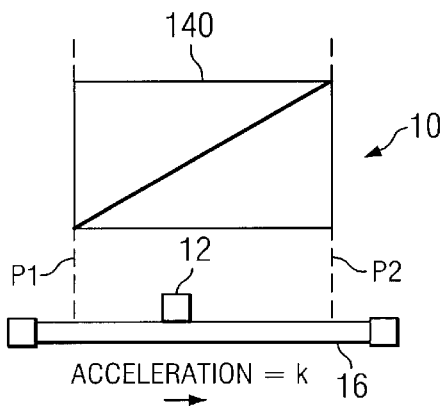
FIGS. 14a and 14b illustrate a method of generating a rectangle with a curved diagonal from a rectangle with a straight diagonal.
Figure 14B:
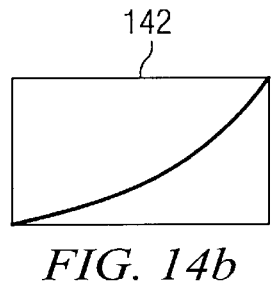
Figure 15A:
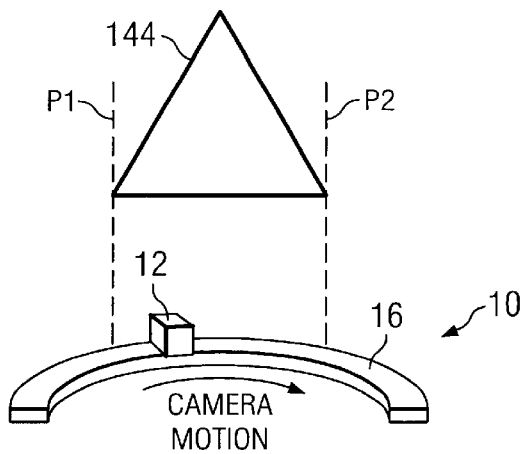
FIGS. 15a and 15b illustrate a method of generating a non-Euclidean shape from a Euclidean shape.
Figure 15B:
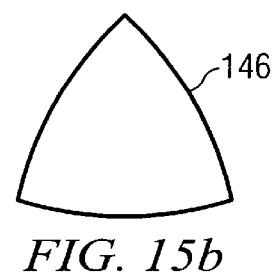
Figure 31A:
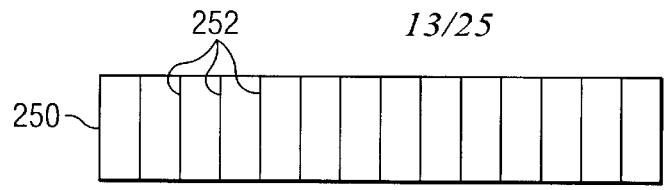
FIGS. 31a through 31d illustrates use of the topological panorama camera to make a visual representation of calculus.
Figure 31B:
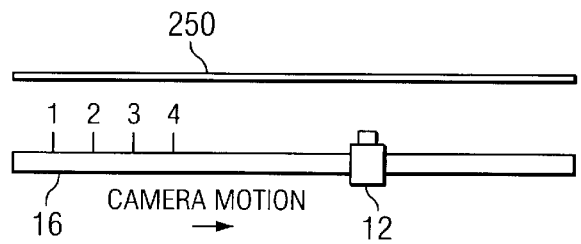
Figure 31C:
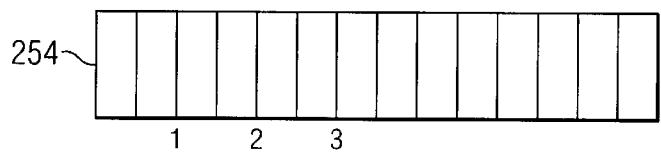
Figure 31D:
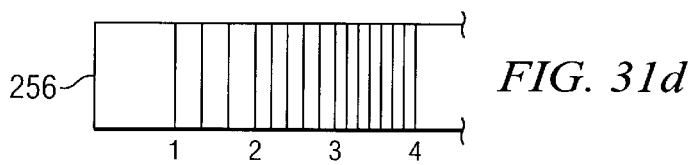

FIG. 31a illustrates a object 250 which is a flat plane with a plurality of evenly spaced vertical lines 252, drawn across its width. In FIG. 31b, the camera 12 moves along track 16 in evenly spaced time intervals to a position specified by a function. Thus, if the function was f(t)=2t, at t=1, the linescan camera 12 would be at position "2", at t=2, the linescan camera would be at position "4", and at t=3, the linescan camera would be at position "6". An image 254 generated using this path is shown in FIG. 31c, which shows evenly spaced vertical lines. Accordingly, it is visually apparent that df(t)/dt equals a constant. Similarly, if the function were $f(t)=t^2$, at t=1, the linescan camera 12 would be at position "1", at t=2, the linescan camera would be at position "4", and at t=3, the linescan camera would be at position "9". An image 256 generated using this path is shown in FIG. 31d, where the vertical lines between regular intervals is increasing. By counting the vertical lines between intervals in the image, the first interval has one line, the second interval has three lines, the third interval has five lines and the fourth interval has seven lines. Accordingly, it can be determined the df(t)dt is linearly increasing. Consequently, the image from the topological panorama camera 10 is showing a visual representation of the derivative of a function. ps Creating a Curved Diagonal By Accelerated Relative Motion FIGS. 14a–b show an example of creating an image that generates certain diagonal lines of an object to curved lines in the image while maintaining other vertical and horizontal straight lines in the object to straight lines in the image. The object 140 shown in is a square or a rectangle with a diagonal line between two of its corners. The linescan camera 12 travels from P1 to P2 under a constant acceleration. The resulting image 142 maintains the straight sides of the rectangle, but the interior diagonal is curved.

The rectangle in FIG. 14 is situated in a plane parallel to the camera's path. In a Fixed X perspective, the camera's constant speed produces a fixed size in the direction of motion; thus, the x,y coordinates of the diagonal display a linear relationship as shown in FIG. 13. In the x dimension of the diagonal of FIG. 14, the camera's acceleration produces continuously changing intervals. This generates a curved diagonal, the direction of curvature determined by whether the acceleration is positive or negative.

Creating a Calculus Spreadsheet to Predict and Generate Shapes and Figures in the Geometry of Relative Motion An algebraic spreadsheet can be created to describe the intertwined, algebraic relationships between camera functions such as camera speed and direction, image scanning rate and direction, subject distance from the camera, the width of the line from the linescan camera 12, and lens magnification. The spreadsheet enables a user to predict and control image results.

Similarly, students in a calculus classroom can create a calculus-based spreadsheet where the parameters that control the camera and predict an image are accelerations and/or non-linear functions. The calculus spreadsheet enables students to create many of the figures of the geometry of relative motion described above. The following is an example of a topological panorama camera algebraic spreadsheet and its calculus counterpart.

| Algebra | Calculus |
| --- | --- |
| camera travels uniform speed | camera's motion is acceleration and or non-uniform speed |
| camera travels in a line | camera's motion is two dimensional |
| scanning rate is uniform | scanning rate accelerates or is non-uniform |
| subject moves in one direction | subject's motion is two dimensional |
| subject's distance is stationary or linear to the camera | subject's distance is variable and non-uniform to the camera |
| lens magnification is constant | lens magnification is non-constant |

Method to Create A Geometric Image of Sound; What Does Sound Look Like? What Does Motion Sound Like?

The following describes a method to convert sound into an image (geometric image) and translate an image produced by relative motions, into sound. In other words a method to see what sound looks like and hear what motion sounds like.

A topological camera 10 can act as a "translator" of motion to sound and sound to motion. The appearance of an object in an image expands or contracts due to the interaction of relative motions. For example, an image of a square expands horizontally (in the direction of motion) as the camera moves slowly past the object. The square contracts as the camera's motion speeds up. The frequencies of sound operate in much the same way. An object's vibration causes the surrounding medium to alternately expand or compress. Low sounds expand, corresponding to an image created through a slow camera speed, and high sounds compress, corresponding to an image generated through faster camera speeds.

Figure 32A:
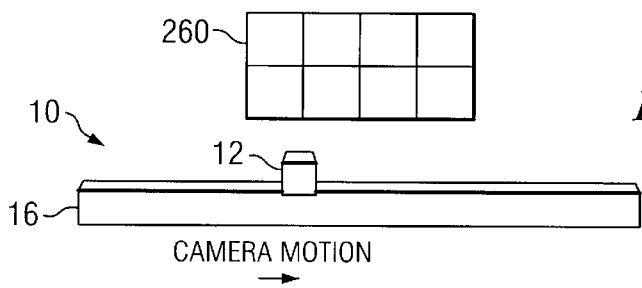
FIGS. 32a, 32b, and 32c illustrate the use of the topological panorama camera to visualize the frequency of sound.
Figure 32B:
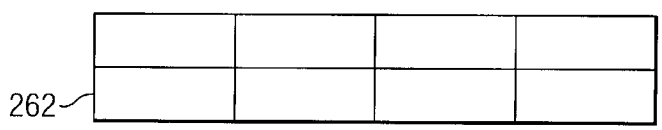
Figure 32C:
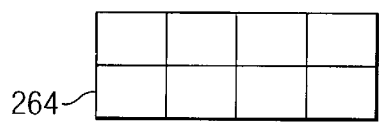

A sound wave can be converted into an image where the frequency of the wave is converted to an assigned camera speed and the desired amplitude is defined by an objects height in an image. (The object's height in an image is a function of lens magnification and its distance from the camera.) A standard unit of measurement or conversion table can be established to "translate" frequencies of sound waves to camera speeds and the varying height of an object to amplitudes. This will enable a student to create an image of sound waves or hear what an image or motion sounds like. For example, generating an image of a grid of squares 260 in a plane parallel to the camera's constant speed as shown in FIG. 32a would produce a sound wave which would correspond to a constant frequency and-amplitude. In FIG. 32b, an image 262 is shown where the linescan camera 12 traveled at a first predetermined speed. Changing the speed of the camera would alter the frequency (x dimension, direction of motion). In FIG. 32c, an image 264 is shown where the linescan camera 12 travels as twice the speed as the camera of FIG. 32b. Students could use a tuning fork to hear a first frequency, corresponding to the motion used to create the first image 262, and a second tuning fork to hear a second frequency which is twice the first frequency, corresponding to the motion used to create the second image 264.

In FIG. 33a, the plane of squares has been placed at an angle to the camera's motion, representing a decrease in amplitude. As shown in the image 266 of FIG. 32b, the camera's constant speed produces a constant frequency, as indicated by the regular interval of vertical lines in the image 266. However, the diminishing height of the boxes of the grid are a result of the change in distance of the object from the camera. The diminishing change in height in the image corresponds to a diminishing amplitude of the sound wave over time.

FIGS. 34a–b illustrates a method to generate an image corresponding to the increase and decrease of sound from the Doppler Effect. The object 270 is a grid of squares drawn about a corner 272. The object 272 is placed in front of the linescan camera 12 as shown in the FIG. 34a. The camera's acceleration up to the corner 272 and deceleration after the corner 272 creates an image 274 in FIG. 34b that depicts the change in frequency and amplitude of a Doppler Shift. Students are thus able to see what a Doppler effect sound pattern looks like.

Combining Geometries—Spatial, Coordinate, Computational, and Relative Motion Geometries There are several methods to describe and create geometry that have been invented through time, such as Spatial geometry—described by Euclid (using the logic of proofs), Riemann, Bolyai, Gauss, Einstein and others, Coordinate geometry—described by Descartes (using algebra and a coordinate system, graph), Computational geometry—invented by Seymour Papert and others, described above and the Geometry of Relative Motion—described above.

Some of the geometers use a physical system to create the geometry. Einstein discovered that mass creates the geometry of curved spacetime, Papert invented a computer language to generate his computational geometry, and the geometry of relative motion described herein utilizes a line sensing device and relative motion to create geometries Many of these geometries can be combined in various ways to create geometric figures. The method described below combines a coordinate geometry with a spatial and relative motion geometries. (Combinations of spatial and relative motion geometries have been described above extensively).

Students can create graphing geometries with the topological panorama camera 10 and relative motion which are based on methods of coordinate geometry. There is a one to one correspondence between the motion of the camera and the image produced from that motion. Thus, changing variables controlling the camera will change the shape of the graph produced. By measuring and plotting characteristics of the image and/or motion profile (for example time vs. velocity), a student can generate a "geometry" on the graph (angle or slope).

Students can draw a figure on a graph (as shown in FIG. 35a) and predict an expected motion profile and geometry of an image. For example in FIG. 35a, the x,y coordinates of the sinusoidal shape on the graph predicts a spring-like motion of the camera or object.

Method to Use a Graphing Geometry to Create a Non Linear Acceleration

Students creating graphing geometries may find it necessary to produce a motion profile for the camera that includes a non linear acceleration. Producing a non linear acceleration is a difficult task. One way to generate it is to program thousands of pairs of (x,y) coordinates or (x,y,z) coordinates to describe a path of motion. Motion control engineers who encounter a need for a non linear acceleration, such as the motion of a robot arm, have sometimes used a method called piecewise linearization.

As seen in FIG. 33a, the geometrical graph of the sinusoidal shape predicts a spring-like motion of the camera or subject. To create a non linear motion profile that will create the spring-like motion, the camera's motion is programmed in modules that are pieced together. In fact, each segment 276 of the graph in FIG. 35b represents a specific linear motion profile, with the x-coordinate representing time and the y-coordinate representing a position on a straight track 16. Photographing a grid of squares with the camera moving with a non constant acceleration, will generate an image of various shapes that can be predicted by the linear portions of the graph.

While the method of generating shapes is described above by actual imaging of an object, an alternative to actually recording an image from light reflected off an object to the linescan camera would be to simulate the recording process in a computer wherein the user chooses an object and specifies the respective paths, motions and directions of the object and the topological panorama camera 10. In this case, the computer would need to calculate and form the image which would be received by the linescan camera and produce an image therefrom.

The computer program described above is expected to predict the geometry of a relative motion in classical physics. A method can also be developed to use the computer simulation to predict (map) the spacetime geometry created by relativistic quantum motion.

Symmetry

Figure 36A:
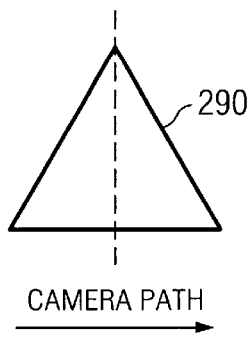
FIGS. 36a through 36k illustrate the use of the topological panorama camera to demonstrate symmetry.
Figure 36B:
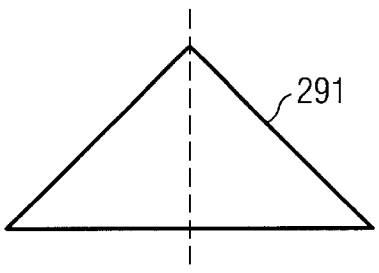

FIGS. 36a–i illustrate the use of the panoramic topological camera 10 for teaching symmetry. FIG. 36a illustrates an object 290 which is an equilateral triangle with its base in parallel with the path of the panoramic topological camera 10. Object 290 could also be an isosceles triangle. Object 290 is symmetrical around a vertical line from the center of its base as shown in FIG. 36a.

Figure 36C:
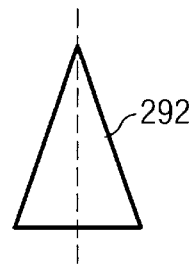

A scan of the object shown in FIG. 36 will result in a symmetrical image, whether the image is stretched (image 291 in FIG. 36b) or compressed (image 292 in FIG. 36c).

Figure 36D:
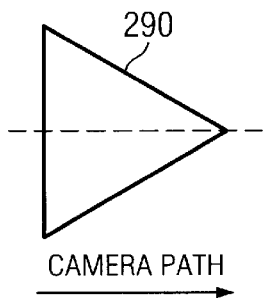
Figure 36E:
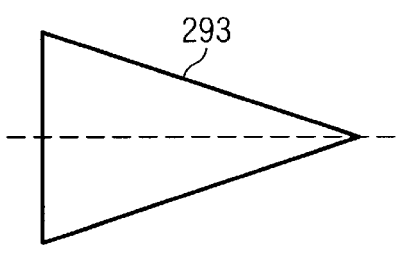
Figure 36F:
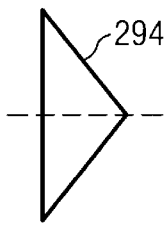

If the object is rotated ninety degrees about its center, such that the line of symmetry is now horizontal, as shown in FIG. 36d, a scan of the object 290 will result in an image which is symmetrical, whether the image is stretched (image 293 in FIG. 36e) or compressed (image 294 in FIG. 36f).

Figure 36G:
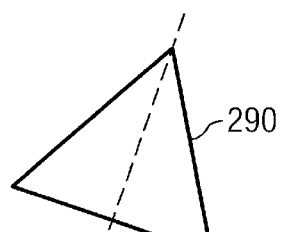
Figure 36H:
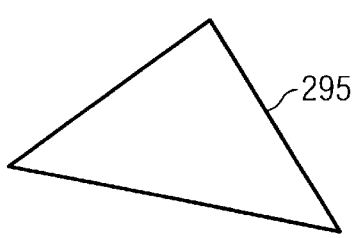
Figure 36I:
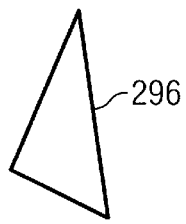

If the object is rotated such that the line of symmetry is not horizontal or parallel as shown in FIG. 36g, however, a scan which creates an image stretches or compresses the object 290, will result in a scalene triangle as shown in stretched image 295 of FIG. 36h or compressed image 296 of FIG. 36i, i.e., one which has three unequal sides. Consequently, using the topological panoromic camera 10, symmetry is preserved using rotations where the line of symmetry is parallel or perpendicular to the path of the camera and symmetry is not preserved for other rotations. An exception to this rule involves the "plane of normal perspective," further discussed in U.S. Pat. No. 4,943,821. The plane of normal perspective exists parallel to the path of the camera at any given setting. For an object (or portion of an object) in this plane, both the horizontal and vertical lengths are preserved in the image. Consequently, if the triangle is placed in the plane of normal perspective, there will be no horizontal or vertical distortion regardless of rotation of the object and, hence, rotations of symmetrical objects in the plane of normal perspective will not affect symmetry in the image.

Figure 36J:
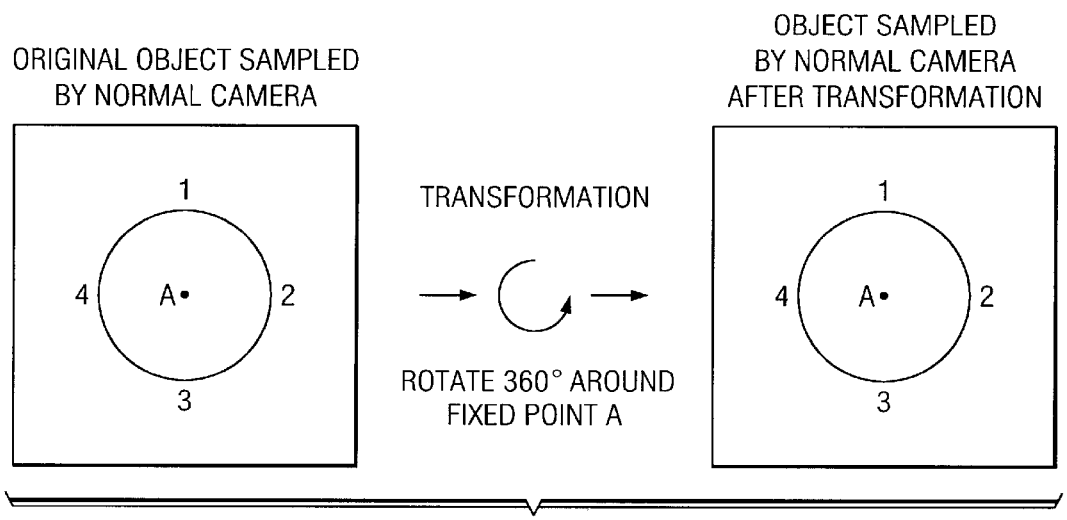
Figure 36K:
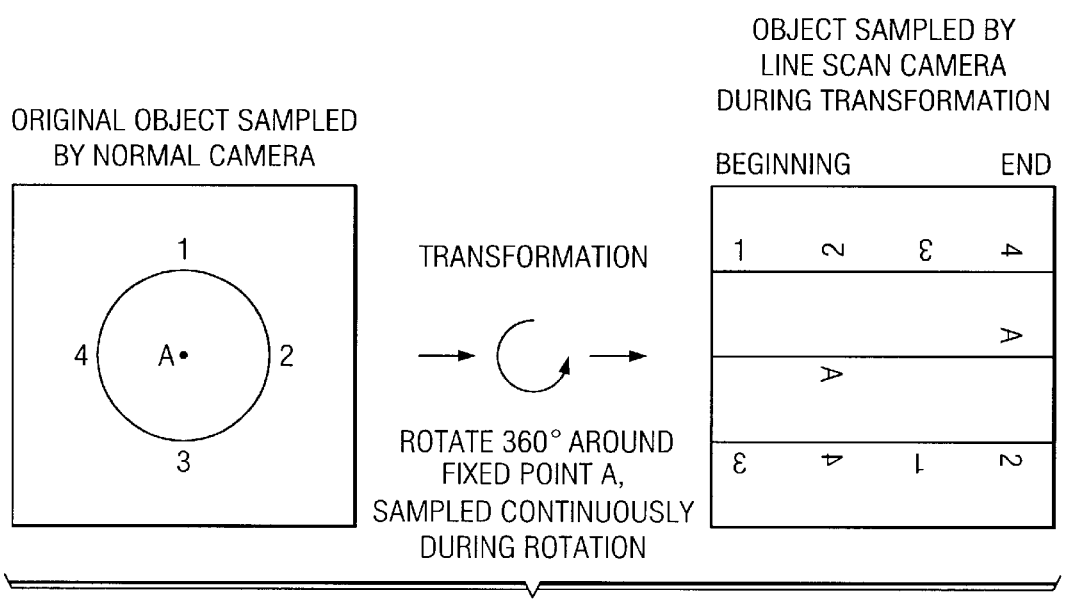

FIGS. 36j–k illustrate another example of symmetry changes during a transformation. Fixed points classify rotations in a spatial, Euclidean geometry. In FIG. 36j, the original object, a circle 297 with center point A, is rotated counterclockwise, 360°. An ordinary camera samples the original object (takes a photo) and then samples the figure again, (takes another photo) after the transformation (the rotation). Students, analyzing the new figure using spatial geometry, would find that the new image retains fixed point A and that the numbers 1,2,3,4 retain a direct orientation and its original symettry.

However; in FIG. 36k, the transformation, the rotation of the original object circle 297, produces a very different result when recorded with a topological panorama camera. Again, circle 297 is rotated 360° counterclockwise. However with a topological panorama camera (and the geometry of relative motion), the object is continuously sampled by a line sensing recorder at the circle's centerpoint during the rotation, the transformation. The results are quite different from spatial geometry. Fixed point A in the original figure becomes line A, the numbers 1, 2,3,4 appear with different orientations, and the circle is no longer a circle (closed figure) but rather broken into two lines. Further, the symmetry, which is preserved through the transformation shown in FIG. 36j is lost in the transformation shown in FIG. 36k. Additionally, the object's intrinsic geometry is changed.

Three Dimensional Modeling

Figure 37:
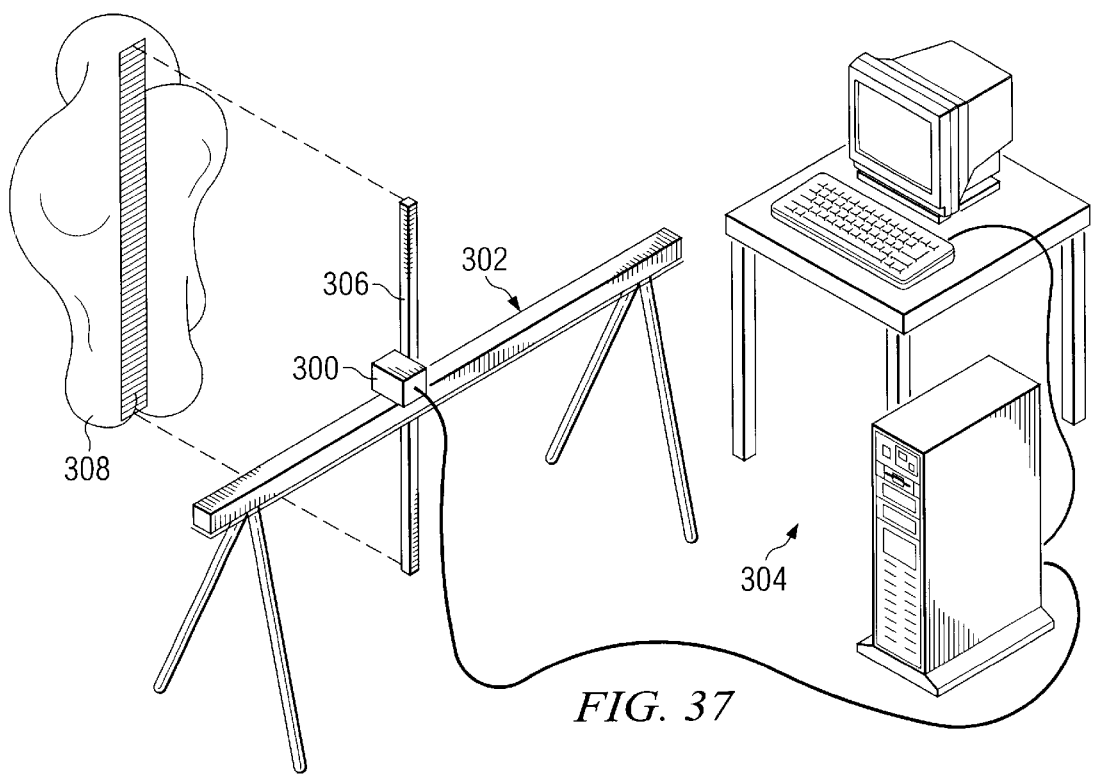
FIG. 37 illustrates an apparatus for generating a computer model of a three dimensional shape.
Figure 49:
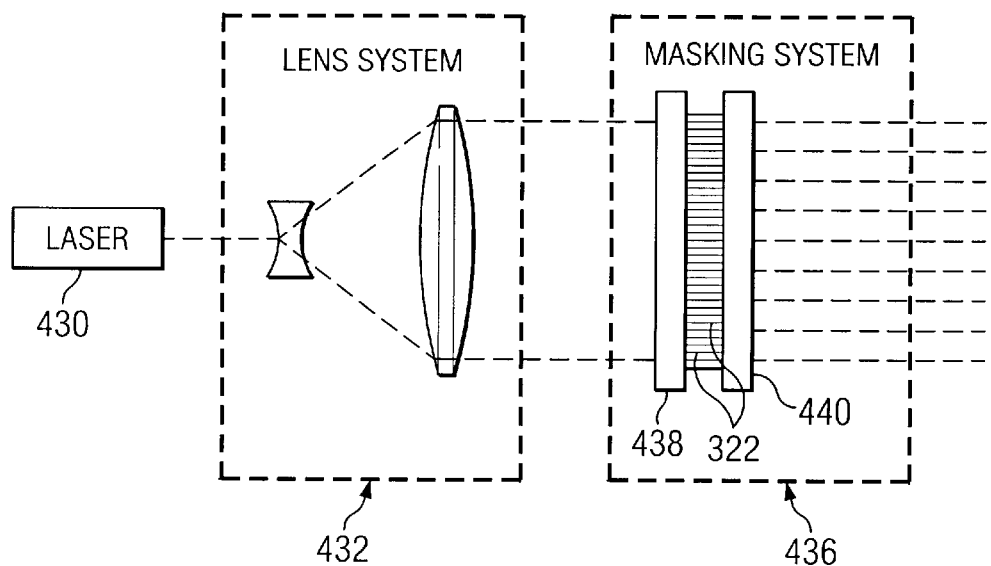
FIG. 49 illustrates a block diagram of a light source for projecting a column of segments on an object.

In FIG. 37, a topological panoramic camera and concepts described above are used to generate a computer file describing a three dimensional object. A topological panoramic camera 300 is mounted on a track 302. The topological panoramic camera can be any device which receives an image through a slit, such as a line scan camera. While the path of the track is shown in FIG. 37 to be a straight linear path, the path could be curved or three dimensional as well. A transport mechanism, not shown, is used to transport the camera 300 along the track in accordance with predetermined criteria, as described above in connection with FIG. 3. The output of the camera 300 is coupled to a computer 304. A light source 306, described in greater detail in connection with FIGS. 49, is also transported in conjunction with the camera 300; in the preferred embodiment the light source 306 is coupled to the side of camera 300. An arbitrary object 308 is positioned in front of the camera 200 such that all or part of the visible portion of the object (from the point of view of the camera 300) will be imaged during a scan.

In operation; the light source 306 is controlled during the scan to generate a pattern on the object. The pattern will be received by the computer, where data points from the pattern will be used to determine the properties of the object 308 at discrete areas (defined by the pattern) on the object. The properties at a collection of these discrete areas can be used to generate the three dimensional computer model of the object. Since only a portion of the object may be visible during the scan (unless the scan path encircles the object), multiple scans may be used to complete the model; alternatively, multiple cameras 300 may be positioned around the object to simultaneously scan all sides of the object 308.

Figure 38A:
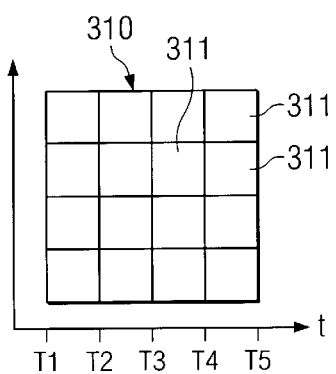
FIGS. 38a through 38c illustrate grids for projecting onto the object.
Figure 38B:
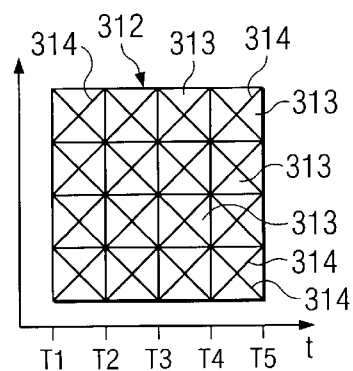
Figure 38C:
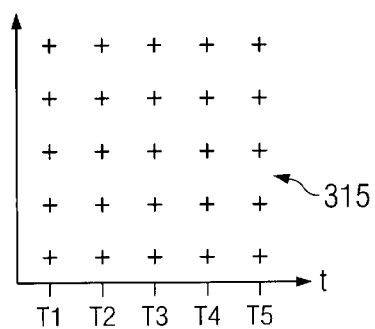

FIGS. 38a–c illustrate patterns which may be generated on the object 308 during a scan. For ease of understanding, the patterns shown in FIGS. 38a and 38b are the patterns which would be received by the camera for a scan of a flat object positioned parallel to the scan path. As discussed in detail below, the pattern received by the camera 300 will vary based on the contours of the object 308 and the distance of the object from the camera 300.

The pattern shown in FIG. 38a is a grid 310 of sub-patterns (rectangles) 311 and the pattern shown in FIG. 38b is a grid 312 of sub-patterns (rectangles) 313 including both diagonals 314. The grid 315 of FIG. 38c is similar to grid 310, with the exception that only the intersection points are shown. As discussed above, and in connection with U.S. Pat. No. 4,943,821, which is incorporated by reference herein, for a given carriage speed and scan rate, the relative lengths of the vertical sides of the rectangles and the horizontal sides of the rectangles will depend upon the distance of the object (in this case a planar surface) from the camera 300. For a rectangle projected upon a curved surface, the vertical sides of the rectangle will remain vertical, but the horizontal sides will be curved (assuming a horizontal scan path). This information can be used to determine the degree of curvature at multiple points on the surface of the object 308.

Opposed to other systems which project a grid on an object, in the preferred embodiment, the invention generates a grid over time, i.e., the grid is generated one vertical line at a time as the image is scanned. At any point in time, the grid is not superimposed on the object 308; rather a portion of the grid to be received through the slit of the topological panoramic camera is superimposed on the object 308. Hence, the light source 306 may generate varying patterns on the object 308 as the scan progresses.

With the light source positioned to the side of the camera 300, as shown in FIG. 37, the light must be directed at a slight angle such that it impinges the object 300 at a point which is reflected back through the slit of the camera 300. This angle will change, however, as the distance between the object and the camera changes. Accordingly, as shown in FIG. 39a, a series of closely spaced horizontal (for a scan in the horizontal direction) line segments 320 are projected onto the object The length of the line segments ensures that part of each enabled segment 320 will be visible through the slit for any point on the object during the scan. The segments 320 can be enabled either individually or in sets to display a predetermined pattern on the object, as will be discussed in greater detail hereinbelow.

The slit the camera will receive only a portion of each sine segment 320, as shown by superimposed slit 322. Hence, the image received by the camera when all segments 320 are projected on the object 308 will be that of a vertical line segment formed of closely spaced dots 324, as shown in FIG. 39b. Accordingly the vertical sides of a column of rectangles shown in FIGS. 38a and 38b, can be produced by projecting all line segments 320 on the object for an instant at predetermined time intervals (T1 though T5 of FIGS. 38a and 38b).

Similarly, the horizontal sides of the rectangles can be produced by projecting line segments 320 which are separated by a desired vertical distance. FIG. 39c shows a set of segments 326 which could be used to form the horizontal sides of the sub-patterns 311, 313. These segments would be projected constantly during the scan, rather than at the predetermined time intervals (T1 through T5), thereby creating the horizontal sides of rectangles 311 and 314 of FIGS. 38a and 38b.

By projecting all segments 320 at regularly spaced intervals during the scan and by projecting segments 326 continuously, a grid of rectangles can be projected onto the object 308, as shown in FIG. 40. The diagonals 314, as shown in FIG. 38b, can be incorporated into the grid by projecting the segments between segments 324 at appropriate times.

As the object is scanned, the pattern, such as grid 310 or 312 (or other pattern) is thus projected onto the object, one vertical slice at a time. Consequently, the grid is projected onto the object without any angular distortion with respect to the point of imaging, as would be the case if the grid were projected from a single point of reference, as opposed to the illustrated point of reference which moves relative to the object (it should be noted that either the camera 300, object 308, or both may be moving) in conjunction with the camera 300.

During the scan, the camera receives an image of the grid as projected onto the object 308. This image is transferred to computer 304, which analyzes the pattern to determine properties of the object which define its shape. Each sub-pattern 311 in grid 310 corresponds to an area on the object; the shape of each sub-pattern 311, as imaged by the topological panoramic camera 300, can provide information related to its corresponding area, such as curvature, angle, and distance.

Figure 41:
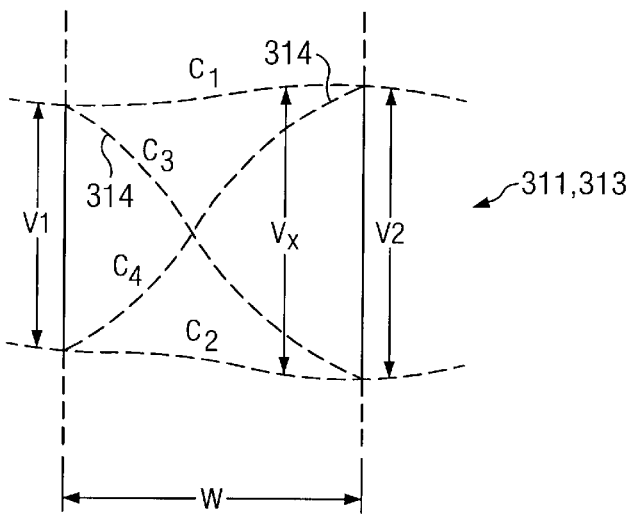
FIG. 41 illustrates a sub-pattern from the grid projected onto an object with arbitrary shape.

FIG. 41 shows an image of a sub-pattern 311. Certain aspects of the received image will be true for all sub-patterns, independent of the contours of the surface upon which they are projected. First, the left and right vertical sides will be straight and vertical. For a given set of camera settings, the height (v1, v2) of the left and right vertical sides will vary depending upon the distance between upon the distance between the camera 300 and the object at the point where the respective lines are projected onto the object. Accordingly, the height of the left and right vertical side of each sub-pattern 311 can be used to determine a distance between the camera and the respective area of the object corresponding to the sub-pattern, or between any fixed reference point or plane (including the plane or normal perspective, described below) and the respective area of the object. The distance (W) between the left and right edges will be constant (for a given set of camera settings) for a horizontal path of motion.

Consequently, using only the vertical sides of the sub-patterns, a computer model of the object can be generated using the vertical sides of each sub-pattern. As the resolution of the grid increases, i.e., the sub-patterns become smaller, a more precise model can be obtained. The information needed to determine the distance to each area can be determined from the pattern of FIG. 38c as well, since only the endpoints of the vertical sides are needed to determine distance. It should be noted however, that using the patterns of FIG. 38a or 38b, any vertical distance between the top and bottom horizontal edges, labeled $v_x$ in FIG. 41, can be used to calculate a distance at any point in the object which corresponds to a point intermediate to the left and right vertical sides of the sub-pattern. The diagonals can also be used for distance measurements. Thus, using these or similar grids, distance measurements between the object and a fixed point can be provided with almost infinite resolution.

The curvature and angle associated with a area of the object corresponding to a sub-pattern can be determined from the top and bottom edges of the image of the sub-pattern. Each of the top and bottom edge will have a contour. If the top and bottom edges are straight, the sub-pattern is indicative of a flat contour at respective locations on the object. The angle of the straight top and bottom edges relative to a horizontal line can be used to determine the angle of this flat area of the surface.

If the top and bottom edges have a curve, this is indicative of a curvature at the respective area of the object. The curves of the top and bottom edges (c1 and c2, respectively) will depend upon the object's curvature (a flat surface having a curvature equal to zero) and the angle of the curvature relative to the plane in which the camera travels. If the diagonals 314 are used, as shown in FIG. 38b, the diagonal's contours will also be indicative of the object's curvature.

Accordingly, the top and bottom edges (and diagonals, if used) of the sub-patterns can be used to determine a curvature and angle at each respective area in the object.

By using a high resolution grid, it would be possible to approximate each edge as straight. In this case, each point in the model of the object could have a distance and an angle measurement.

FIGS. 42a–e provide examples of how the image of the pattern received by the camera 300 and computer 304 for a flat object can be used to derive information about the shape, including surface curvature, of an object. For each example, it is presumed that a grid 310 or 312 of the type shown in FIGS. 38a–b was projected upon the object, although other patterns could be used as well. Each figure shows a top view of the scan path of the camera 300 and a portion of the object 308 relative to the plane of normal perspective (PNP), along with the corresponding image of a single rectangle of the grid received by the camera 300 and sent to the computer 304. For purposes of illustration, it is assumed that the rectangles 311 (diagonals 314 of rectangles 313 are shown as dashed lines) which are projected on the surface of the object 308 are squares.

Figure 42A:
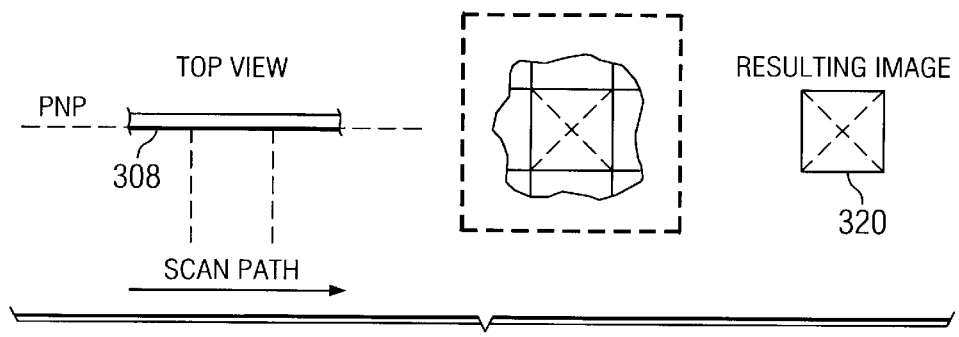
FIGS. 42a through 42e illustrate sub-patterns created by a scan of flat surfaces at various distances and angles.

In FIG. 42a, the image 330 received by the camera is a square image. For an object (or portion of an object) in the plane of normal perspective, both the horizontal and vertical lengths are preserved in the image. Since the object is in the plane of normal perspective, the resulting image remains square. Accordingly, from a scan of an unknown object, if resulting image 320 is received it can be determined that the portion of the object 308 corresponding to the image 320 is a flat object in the plane of normal perspective. Consequently, the shape of the portion of the object 308 and the distance between the camera and this portion of the object can be determined from the resulting image.

Figure 42B:
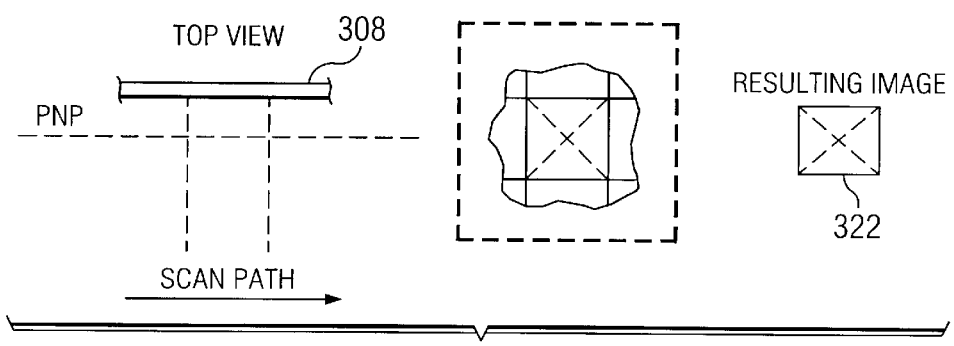

In FIG. 42b, the resulting image 332 is a rectangle having vertical sides which are shorter than the horizontal sides. Because the horizontal sides of the rectangle are straight, the portion of the object corresponding to the projected square 311 is flat. Further, since the vertical sides of the rectangle are shorter in length than the horizontal sides, it can be determined that this portion of the object is behind the plane of normal perspective. The distance between the camera 300 and object 308 can be determined from the length of the vertical sides of image 332.

Figure 42C:
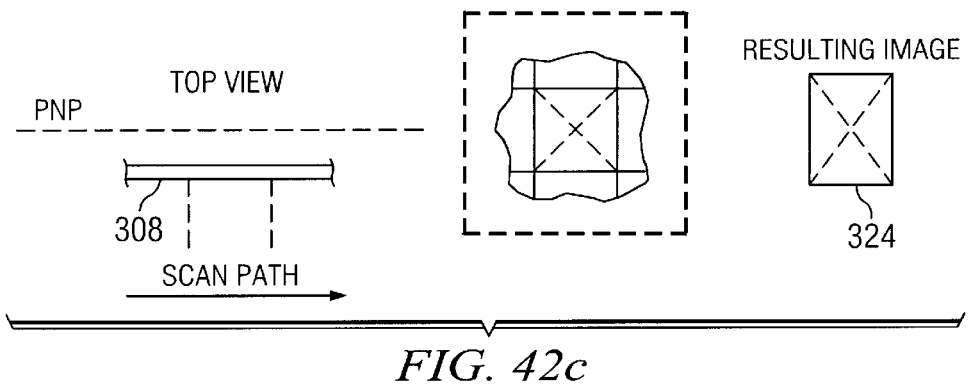

In FIG. 42c, the resulting image 334 is a rectangle having vertical sides which acre longer than the horizontal sides. Because the horizontal sides of the rectangle are straight, the portion of the object corresponding to the projected square 311 is flat. Further, since the vertical sides of the rectangle are longer in length than the horizontal sides, it can be determined that this portion of the object is in front of the plane of normal perspective. The distance between the camera 300 and object 308 can be determined from the length of the vertical sides of image 334.

Figure 42D:
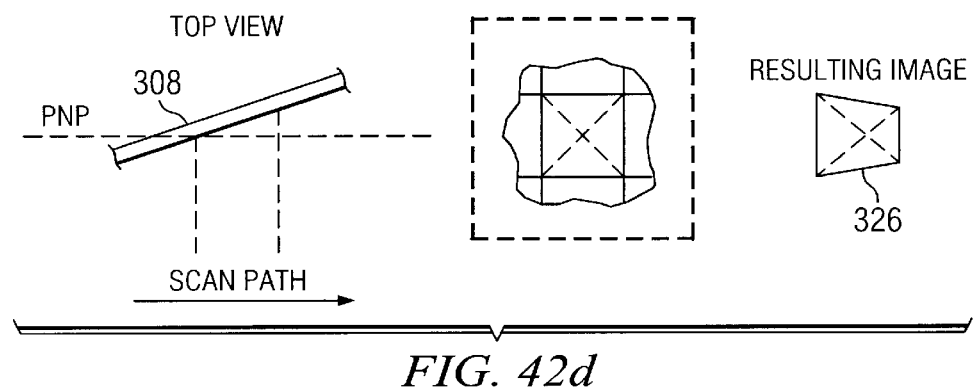

In FIG. 42d, the image 336 is a quadrilateral having vertical sides in which the right vertical side is shorter than the left side, resulting in a trapezoid. Further, the left side is the same length as the distance between the right and left sides. Because the "horizontal" sides of the resulting image 336 are straight, albeit slanted, the portion of the object corresponding to the projected square 311 is flat. Since the right vertical side is smaller than the left side, the object must be slanted away from the camera, from left to right. The left side of this portion of the object is in the plane of normal perspective (since its length is the same as the distance between the right and left sides, i.e., v1=W). The distance of the right vertical side from the camera 300 can be determined from its length.

Figure 42E:
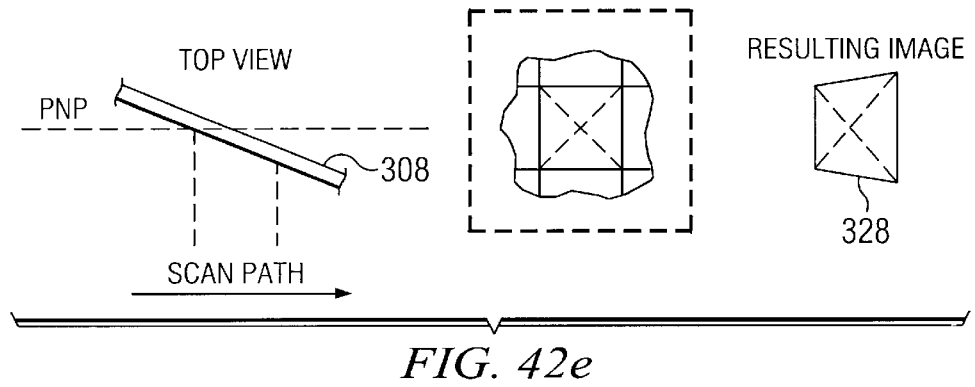

Similarly, in FIG. 42e, the image 338 is a quadrilateral having vertical sides in which the right vertical side is longer than the left side horizontal side. Further, the left side is the same length as the distance between right and left sides. Because the horizontal sides of the trapezoid are straight, the portion of the object corresponding to the projected square 311 is flat. Since the right vertical side is longer than the left side, the object must be slanted towards the camera, from left to right. The left side of this portion of the object is in the plane of normal perspective (since its vertical length, v1, is the same as the distance between right and left sides). The distance of the right vertical side from the camera 300 can be determined from its length.

Figure 43A:
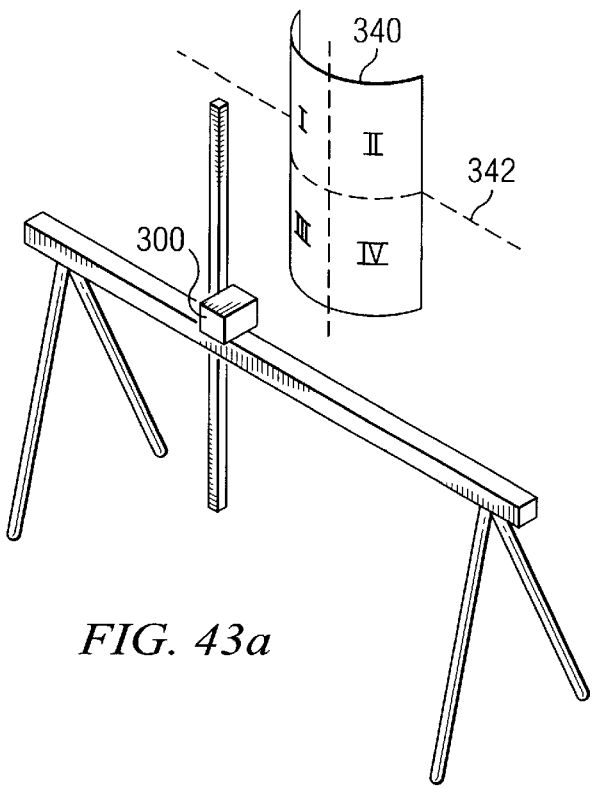
FIGS. 43a through 43j illustrate sub-patterns created by a scan of a cylindrical object.

FIGS. 43a–j illustrate the resulting images from a scan of a cylindrical object or portion thereof. FIG. 43a illustrates a perspective view of the camera 300 scanning a cylindrical column 340. The cylinder is divided into four quadrants labeled I, II, III and IV. Quadrant I lies on the left half of the cylinder 340, above a line 342 at camera level, quadrant II lies on the right half of the cylinder 340, above the cameral level line 342, quadrant III lies on the left half of the cylinder 340, below line 342, and quadrant IV lies on the right half of the cylinder 340, below the cameral level line 342.

Figure 43B:
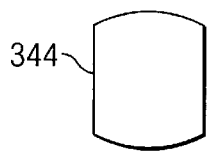

FIG. 43b illustrates the resulting image 344 from a scan of a square superimposed on the object at the intersection of all four quadrants. The resulting image 344 has straight left and right vertical sides, with curved top and bottom sides. The top and bottom sides curve in opposite directions. If the square superimposed on the cylinder 340 is centered line 342, the top and bottom halves will be symmetrical; otherwise, the curvatures of the top and bottom will be different. The degree of curvature of the top and bottom sides will depend upon the curvature of the cylinder 340. If the cylinder 340 were closer to the camera 300, the resulting image would be taller; if the cylinder 340 were further from the camera, the resulting image 344 would be wider.

Figure 43C:
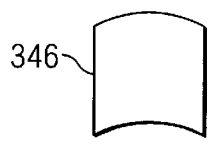

FIG. 43c illustrates a resulting image 346 from a scan of a square superimposed on the object at the boundary between quadrants I and II. The left and right vertical sides of the resulting image 346 are straight and the top and bottom sides are curved upwardly. The top side will be curved to a greater degree than the bottom side. The degree of curvature of the top and bottom sides will depend upon the curvature of the cylinder 340 and the placement of the superimposed square along the boundary between quadrants I and II. If the cylinder 340 were closer to the camera 300, the resulting image 346 would be taller; if the cylinder 340 were further from the camera, the resulting image 346 would be wider.

Figure 43D:
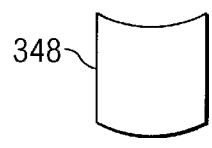

FIG. 43d illustrates a resulting image 348 from a scan of a square superimposed on the object at the boundary between quadrants III and IV. The left and right vertical sides of the resulting image 348 are straight and the top and bottom sides are curved downwardly. The top side will be curved to a lesser degree than the bottom side. The degree of curvature of the top and bottom sides will depend upon the curvature of the cylinder 340 and the placement of the superimposed square along the boundary between quadrants III and IV. If cylinder 340 were closer to the camera 300, the resulting image 348 would be taller; if the cylinder 340 were further from the camera, the resulting image 348 would be wider.

Figure 43E:
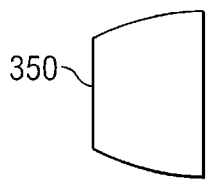

FIG. 43e illustrates a resulting image 350 from a scan of a square superimposed on the object at the boundary between quadrants I and III. The left and right vertical sides of the resulting image 350 are straight and the top and bottom sides are curved outwardly. The degree of curvature of the top and bottom sides will depend upon the curvature of the cylinder 340 and the placement of the superimposed square along the boundary between quadrants I and III. If cylinder 340 were closer to the camera 300, the resulting image 350 would be taller; if the cylinder 340 were further from the camera, the resulting image 346 would be wider.

Figure 43F:
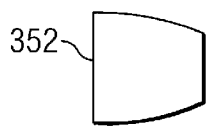

FIG. 43f illustrates a resulting image 352 from a scan of a square superimposed on the object at the boundary between quadrants II and IV. The left and right vertical sides of the resulting image 352 are straight and the top and bottom sides are curved inwardly. The degree of curvature of the top and bottom sides will depend upon the curvature of the cylinder 340 and the placement of the superimposed square along the boundary between quadrants II and IV. If cylinder 340 were closer to the camera 300, the resulting image 352 would be taller; if the cylinder 340 were further from the camera, the resulting image 352 would be wider.

Figure 43G:
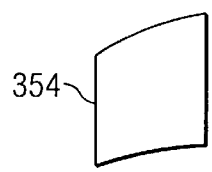

FIG. 43g illustrates a resulting image 354 from a scan of a square superimposed on quadrant I of the object. The left and right vertical sides of the resulting image 354 are straight and the top and bottom sides are curved upwardly to the right. The degree of curvature of the top side will be greater than that of the bottom side; the curvature of the top and bottom sides will depend upon the curvature of the cylinder 340 and the position of the superimposed square within the quadrant. If cylinder 340 were closer to the camera 300, the resulting image 354 would be taller; if the cylinder 340 were further from the camera, the resulting image 354 would be wider.

Figure 43H:
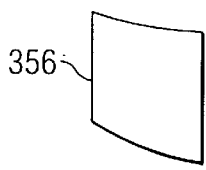

FIG. 43h illustrates a resulting image 356 from a scan of a square superimposed on quadrant III of the object. The left and right vertical sides of the resulting image 356 are straight and the top and bottom sides are curved downwardly to the right. The degree of curvature of the top side will be less than that of the bottom side; the curvature of the top and bottom sides will depend upon the curvature of the cylinder 340 and the position of the superimposed square within the quadrant. If cylinder 340 were closer to the camera 300, the resulting image 356 would be taller; if the cylinder 340 were further from the camera, the resulting image 356 would be wider.

Figure 43I:
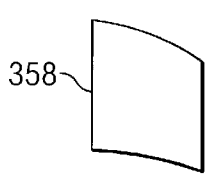

FIG. 43i illustrates a resulting image 358 from a scan of a square superimposed on quadrant II of the object. The left and right vertical sides of the resulting image 358 are straight and the top and bottom sides are curved upwardly to the left. The degree of curvature of the top side will be greater than that of the bottom side; the curvature of the top and bottom sides will depend upon the curvature of the cylinder 340 and the position of the superimposed square within the quadrant. If cylinder 340 were closer to the camera 300, the resulting image 358 would be taller; if the cylinder 340 were further from the camera, the resulting image 358 would be wider.

Figure 43J:
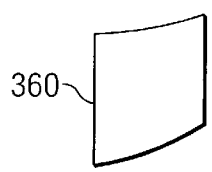

FIG. 43j illustrates a resulting image 360 from a scan of a square superimposed on quadrant IV of the object. The left and right vertical sides of the resulting image 360 are straight and the top and bottom sides are curved downwardly to the left. The degree of curvature of the top side will be less than that of the bottom side; the curvature of the top and bottom sides will depend upon the curvature of the cylinder 340 and the position of the superimposed square within the quadrant. If cylinder 340 were closer to the camera 300, the resulting image 360 would be taller; if the cylinder 340 were further from the camera, the resulting image 360 would be wider.

Figure 44A:
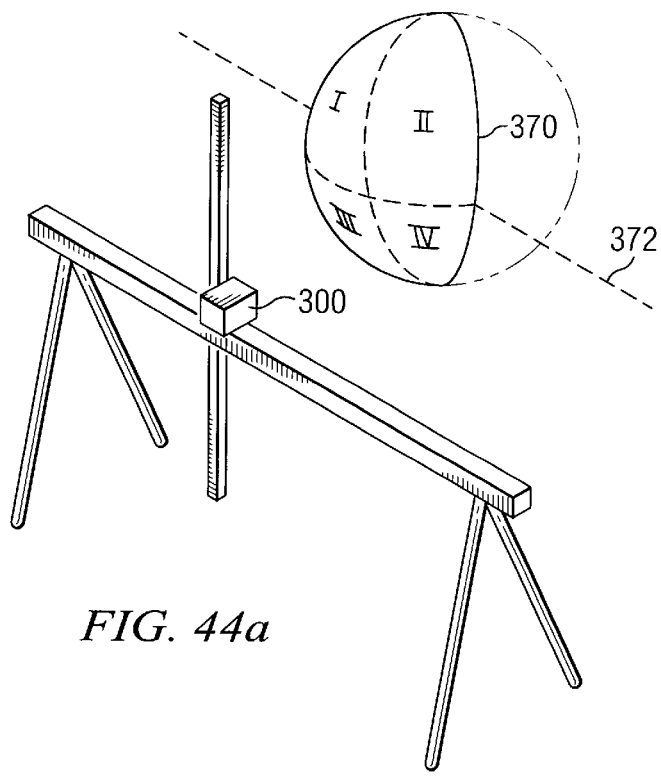
FIGS. 44a through 44j illustrate sub-patterns created by a scan of a spherical object.

FIGS. 44a–j illustrate the resulting images from a scan of a spherical object 370 or portion thereof. FIG. 44a illustrates a perspective view of the camera 300 scanning a spherical object 370. The sphere 370 is divided into four quadrants labeled I, II, III and IV. Quadrant I lies on the left half of the spherical object 370, above a line 372 at camera level, quadrant II lies on the right half of the sphere 370, above e the cameral level line 372, quadrant III lies on the left half of the sphere 370, below line 372, and quadrant IV lies on the right half of the sphere 370, below the cameral level line 372.

Figure 44B:
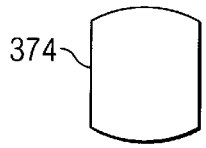

FIG. 44b illustrates the resulting image 374 from a scan of a square superimposed on the object at the intersection of all four quadrants. The resulting image 374 has straight left and right vertical sides, with curved top and bottom sides. The top and bottom sides curve in opposite directions. If the square superimposed on the spherical object 370 is centered at line 372, the top and bottom halves will be symmetrical; otherwise, the curvatures of the top and bottom will be different. The shape of the curvature of the top and bottom sides will depend upon the curvature of the spherical object 370. If the spherical object 370 were closer to the camera 300, the resulting image would be taller; if the spherical object 370 were further from the camera, the resulting image 374 would be wider.

Figure 44C:
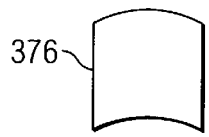

FIG. 44c illustrates a resulting image 376 from a scan of a square superimposed on the object at the boundary between quadrants I and II. The left and right vertical sides of the resulting image 376 are straight and the top and bottom sides are curved upwardly. The top side will be curved to a greater degree than the bottom side. The shape of curvature of the top and bottom sides will depend upon the curvature of the spherical object 370 and on the placement of the superimposed square along the boundary between quadrants I and II. If the spherical object 370 were closer to the camera 300, the resulting image 376 would be taller; if the spherical object 370 were further from the camera, the resulting image 376 would be wider.

Figure 44D:
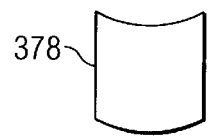

FIG. 44d illustrates a resulting image 378 from a scan of a square superimposed on the object at the boundary between quadrants III and IV. The left and right vertical sides of the resulting image 378 are straight and the top and bottom sides are curved downwardly. The top side will be curved to a lesser degree than the bottom side. The shape of curvature of the top and bottom sides will depend upon the curvature of the spherical object 370 and on the placement of the superimposed square along the boundary between quadrants III and IV. If spherical object 370 were closer to the camera 300, the resulting image 378 would be taller; if the spherical object 370 were further from the camera, the resulting image 378 would be wider.

Figure 44E:
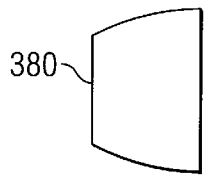

FIG. 44e illustrates a resulting image 380 from a scan of a square superimposed on the object at the boundary between quadrants I and III. The left and right vertical sides of the resulting image 380 are straight and the top and bottom sides are curved outwardly. The shape of curvature of the top and bottom sides will depend upon the curvature of the spherical object 370 and on the placement of the superimposed square along the boundary between quadrants I and III. If spherical object 370 were closer to the camera 300, the resulting image 380 would be taller; if the spherical object 370 were further from the camera, the resulting image 380 would be wider.

Figure 44F:

FIG. 44f illustrates a resulting image 382 from a scan of a square superimposed on the object at the boundary between quadrants II and IV. The left and right vertical sides of the resulting image 382 are straight and the top and bottom sides are curved inwardly. The shape of curvature of the top and bottom sides will depend upon the curvature of the spherical object 370 and on the placement of the superimposed square along the boundary between quadrants II and IV. If spherical object 370 were closer to the camera 300, the resulting image 382 would be taller; if the spherical object 370 were further from the camera, the resulting image 380 would be wider.

Figure 44G:

FIG. 44g illustrates a resulting image 384 from a scan of a square superimposed on quadrant I of the object. The left and right vertical sides of the resulting image 384 are straight and the top and bottom sides are curved upwardly to the right. The degree of curvature of the top side will be greater than that of the bottom side; the curvature of the top and bottom sides will depend upon the curvature of the spherical object 370 and the position of the superimposed square in the quadrant. If spherical object 370 were closer to the camera 300, the resulting image 384 would be taller; if the spherical object 370 were further from the camera, the resulting image 384 would be wider.

Figure 44H:
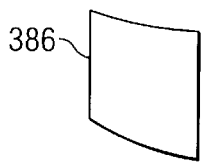

FIG. 44h illustrates a resulting image 386 from a scan of a square superimposed on quadrant III of the object. The left and right vertical sides of the resulting image 386 are straight and the top and bottom sides are curved downwardly to the right. The degree of curvature of the top side will be less than that of the bottom side; the curvature of the top and bottom sides will depend upon the curvature of the spherical object 370 and the position of the superimposed square in the quadrant. If spherical object 370 were closer to the camera 300, the resulting image 386 would be taller; if the spherical object 370 were further from the camera, the resulting image 386 would be wider.

Figure 44I:
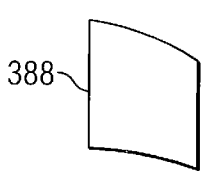

FIG. 44i illustrates a resulting image 388 from a scan of a square superimposed on quadrant II of the object. The left and right vertical sides of the resulting image 388 are straight and the top and bottom sides are curved upwardly to the left. The degree of curvature of the top side will be greater than that of the bottom side; the curvature of the top and bottom sides will depend upon the curvature of the spherical object 370 and the position of the superimposed square in the quadrant. If spherical object 370 were closer to the camera 300, the resulting image 388 would be taller; if the spherical object 370 were further from the camera, the resulting image 388 would be wider.

Figure 44J:
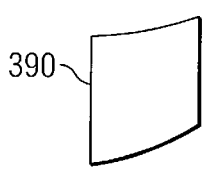

FIG. 44j illustrates a resulting image 390 from a scan of a square superimposed on quadrant IV of the object. The left and right vertical sides of the resulting image 390 are straight and the top and bottom sides are curved downwardly to the left. The degree of curvature of the topside will be less than that of the bottom side; the curvature of the top and bottom sides will depend upon the curvature of the spherical object 370 and the position of the superimposed square in the quadrant. If spherical object 370 were closer to the camera 300, the resulting image 390 would be taller; if the spherical object 370 were further from the camera, the resulting image 390 would be wider.

While the resulting images 344–360 for the cylinder appear similar to the resulting images 374–390 for the sphere, the top and bottom sides of the resulting images will have different shapes because of the different contours of the two objects. Distinguishing between shapes related to different resulting images is discussed in greater detail below.

FIGS. 43a–j and 44a–j illustrate scans of cylindrical and spherical objects with positive curvatures. The degree of curvature of the top and bottom horizontal sides of the sub-pattern will vary depending upon the degree of curvature of the object. Resulting images of scans of cylindrical and spherical objects with negative curvatures, i.e, concave objects, will be similar to the scans shown in FIGS. 43b–j and 44b–j, except inward curving top and bottom lines for the positive curvature objects will be outward curving for the negative curvature object and outward curving top and bottom lines for the positive curvature objects will be inward curving for the negative curvature object.

To derive the shape of an unknown object, one or more scans (multiple scans, either consecutive of simultaneous, may be necessary in order to scan the entire surface of an object) are made of the object. As described above, the light source projects a sequence of beams, such that a grid or other pattern is received by the light source over the duration of the scan. The grid is broken down into multiple sub-patterns (the resulting images shown above in connection with FIGS. 42–44), which provide information on the shape at corresponding areas of the object.

One way in which the sub-patterns can be used to generate surface information is by comparison with previously stored images. In this case, a database of images is compiled. The database could have varying degrees of complexity depending upon the intended application for the device. A simple database may have stored images of sub-patterns taken of flat objects only. This could be produced by taking actual scans of a flat object at different angles and positions relative to the camera 300. A more complex database could included sub-images of flat objects and cylindrical objects. An even more complex database could include images of sub-patterns of flat objects, cylindrical objects and spherical objects. Other shapes, such as elliptical and parabolic curves could also be included.

Such a database would only need to be derived once; thereafter, any number of objects could be scanned using the database. After (or during) the scan of an object, the sub-patterns generated by the scan are compared with sub-patterns (hereinafter "signatures") stored in the database. For each sub-pattern, there will be a signature which is the closest match, using a predetermined matching algorithm, such as a least squares algorithm. By comparing the imaged sub-pattern with each signature using the matching algorithm, the closest match is obtained. Each signature is related to specified surface information, such as the curvature of the object and its angle relative to the camera.

Figure 45:
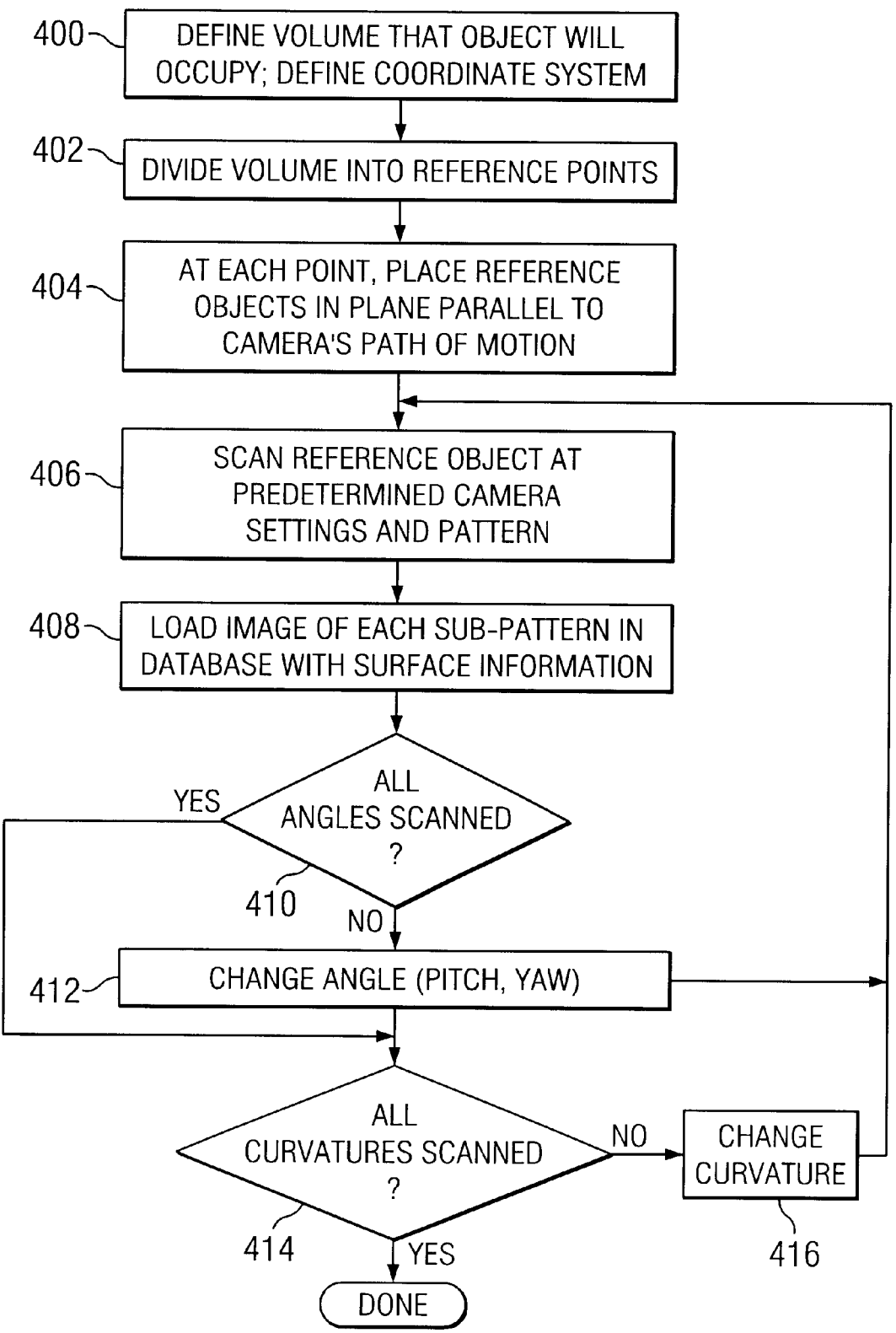
FIG. 45 illustrates a flow chart for creating a database of signatures for comparison with sub-patterns.
Figure 46:
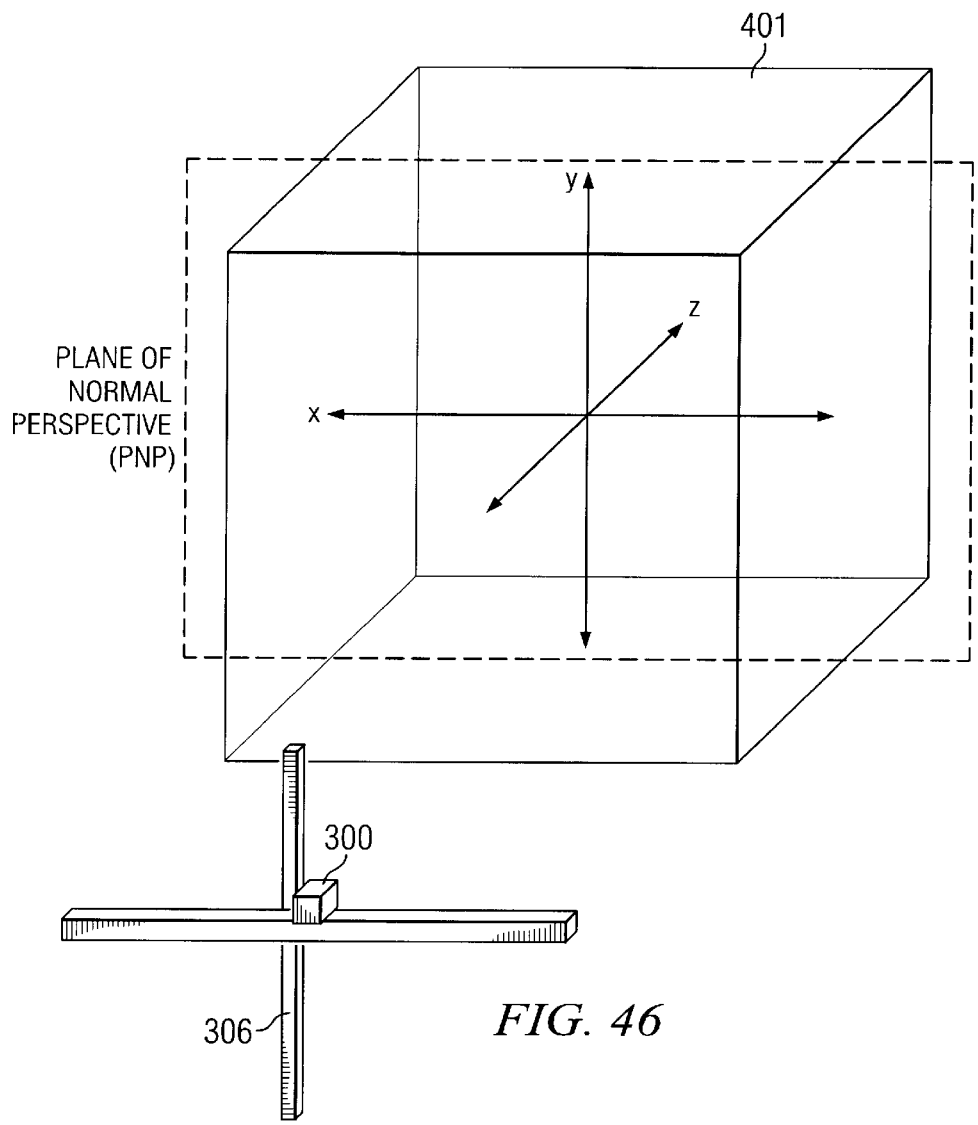
FIG. 46 illustrates a defined volume and coordinate system for scanning objects.

FIG. 45 illustrates a flow chart describing the process for generating a database of signatures for objects of known shape. In step 400, a volume is defied in which the object will be placed. A coordinate system for the space is defined. FIG. 46 illustrates a defined volume 401 wherein the origin of the three dimensional axes is placed in:the center of the volume 401. Alternatively, the origin could be place in the lower left corner of the volume. The camera settings are defined such that the plane of normal perspective bisects the volume 401. In another alternative, the origin could be placed such that the x-axis is on the path of motion of the camera, with the origin at the start of the path.

In step 402, the volume is divided into reference points; these are the points at which the samples will be scanned to generate the signatures. A greater number of points will generate more exact matches when a scan is performed in later steps.

In step 404, reference objects are placed in a plane parallel to the cameras path of motion. Initially, flat objects are used at a zero degree angle (i.e., parallel to the plane of normal perspective.

Figure 47:
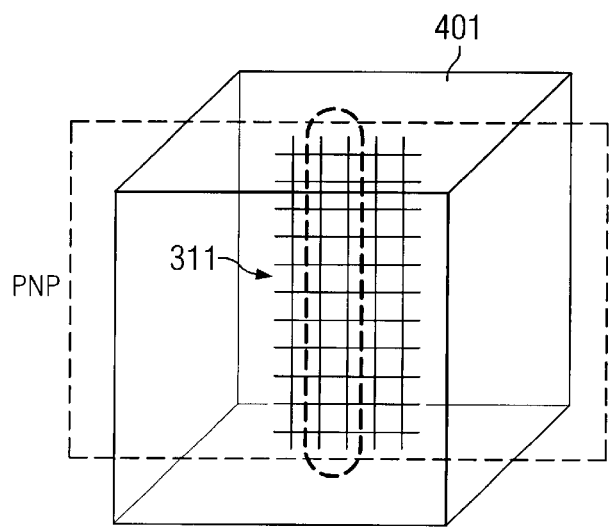
FIG. 47 illustrates the scanning of a reference object to generate signatures.

In step 406, the objects are scanned. For purposes of generating the signatures, it is only necessary to record the images of the sub-patterns in a single column of the grid, as shown in FIG. 47. In step 408, the image for each sub-pattern is stored in a database along with the following information: (1) location of the corresponding sub-pattern in the column, (2) a distance measurement, (3) the curvature of the reference object, and (4) the angle of the reference object.

If all angles of the reference object, including variations in the pitch and yaw, have not been scanned in decision block 410, the object is rotated in step 412 and steps 406 and 408 are repeated. Once all angles are scanned in decision block 410 flow continues to decision block 414. Decision block 414 causes steps 406 through 412 to repeat until all curvatures have been scanned. The reference objects for the curvatures could be spheres and/or cylinders. Reference objects having both positive (concave) and negative (convex) curvatures should be used to generate the signatures.

The steps of FIG. 45 need only be performed once. While using curvatures to define an object at each reference point by distance, curvature and angle would provide the most accurate representation, a suitable representation could be obtained by using only flat reference objects and using a high resolution grid.

Figure 48:
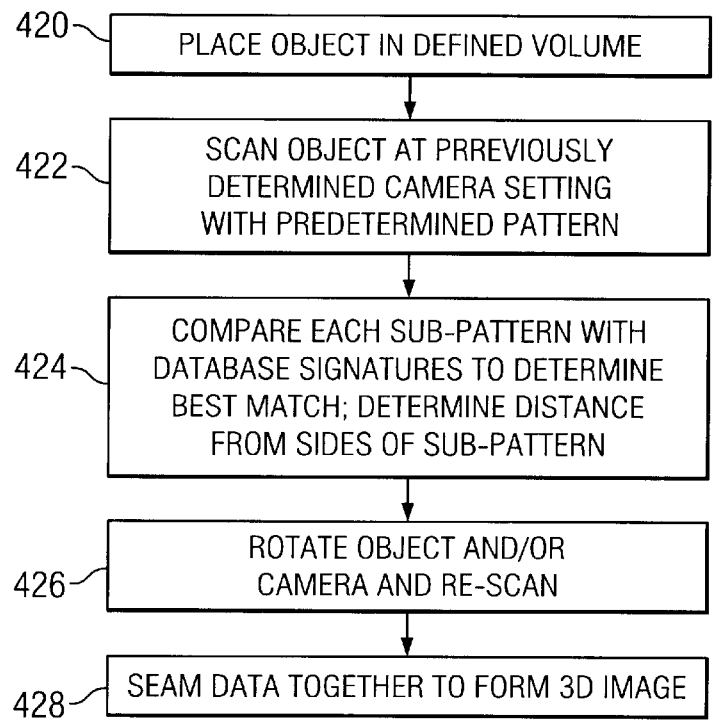
FIG. 48 illustrates a flow chart for scanning an object of arbitrary shape.

Once the signatures have been obtained a model of an arbitrary object can be obtained by the method shown in FIG. 48. In step 420, an arbitrary object is placed in the defined volume 401 and, in step 422, a scan is performed, projecting the image of the grid as the scan is made. In step 424, the sub-patterns are compared with sub-patterns stored in the database generated using the method of FIG. 45. The sub-patterns are compared only with signatures of reference objects scanned at the same position in the column.

In matching the images of the sub-patterns to the signatures, two methods could be used. In the first method, the reference database of FIG. 45 is generated at multiple distances from the camera. The image of a sub-pattern is compared to all shapes and angles at each distance, using, for example, a least squares comparison. The database entries for closest matching signature will therefore-have all data for distance, curvature, and angle. Alternatively, the reference objects could be scanned at a single distance, for example, at the plane of normal perspective. The images of the sub-patterns could be scaled prior to matching. The database entries for the closest matching signature would provide the data for curvature and angle. Distance could be computed mathematically from the lengths of the sides of the image.

In step 426, the object and/or camera is rotated and re-scanned. The data from the two scans is seamed together in block 428 to generated a computer model for the entire object. In some cases, it may be necessary to perform three scans. Also, as stated above, it is possible that two or three cameras 300 could perform the scan simultaneously from different angles. If the plane of normal perspective and the origin are placed at the center of the volume, it may be easier to line up each scan and seam the data together. Alternatively, the track 302 could encompass the object 208 using three to four straight segments or a circular or elliptical track. In another alternative, the camera could remain stationary while the object was rotated about a known axis.

FIG. 49 illustrates an embodiment of the light source 306. In this embodiment, a laser 430 is coupled to a lens system 432 including a plurality of lenses 434 to spread the laser light into a wide beam. A masking system 436 includes a fixed mask 438 to generate the column of segments 320 shown in FIG. 39a. A variable mask 440 selectively passes segments 320 to the object 308 under control from the camera 306. The variable mask 440, for example, liquid crystal technology to selectively pass or block segments 320.

In an alternative embodiment, an array of light emitting diodes, of the type used in laser quality printers made by OKIDATA CORP of Japan are used to generate the segments 320.

As an alternative to using a database of signatures, as described above, the three dimensional information can be derived mathematically directly from the sub-patterns. As described above, the distance between the camera and the object can be derived mathematically or empirically using the lengths of each vertical side of the sub-pattern, v1 and v2. Further, the slope can be determined by reference to the difference in the lengths of the two vertical sides. Accordingly, a mean distance and slope for multiple points on the object can be determined for each sub-pattern in the grid. The number of points which are used to generate the model could be increased by measuring multiple vertical segments between the top and bottom horizontal sides ($v_x$ in FIG. 41). Any point between the two vertical sides of a sub-pattern can be used to provide an additional distance measurement. Additional resolution can be obtained by using the diagonal lines 314 of the sub-pattern 313 using the known distances between the diagonal lines themselves and between the diagonal lines and the top and bottom lines and comparing them with vertical distances in the received image.

The distances found using the vertical measurement between the top or bottom horizontal sides of a sub-pattern yields a set of distance measurements which can the be used to generate a curvature for the sub-pattern.

As an alternative to the above methods, one can mathematically determine the Euler's number (or curvature) within each sub-pattern through traditional mathematical methods or through the method described in this patent. One method that can be used is to find the distance to the origin and/or PNP for each sub-pattern using $v_1$ and $v_2$ (shown in FIG. 41) and then determine the curvature of the sub-pattern mathematically from the top and bottom horizontal sides (and diagonals, if present). This method locates each sub-pattern marked on the object locally and globally and provides reference points for each sub-pattern curvature.

Also, the Euler's number for the entire object can be determined from the sub-patterns by the traditional mathematical method or by using signatures as described above in this patent. Adding up each sub-pattern curvature (or Euler's number) will describe the global topology and overall curvature of the object.

The present invention provides significant advantages over the prior art. First, the calculations are simplified because the grid is generated without angular distortion. The nature of the topological panoramic camera renders an image from which distance, curvature and angle can be determined.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of determining the shape of an object, comprising the steps of:

scanning the object through an optical slit moving using relative motion between the slit and the object while projecting light on said object in a predetermined sequence to form a pattern on the object and recording an image of a reflection of said pattern received through said optical slit as the object is scanned; and analyzing the geometric properties of the reflection of said pattern to determine the shape of said object.

2. The method of claim 1 wherein said pattern includes a plurality of discernable sub-patterns and said step of analyzing said object includes the step of analyzing each of said sub-patterns to determine shape information at a corresponding area of the object.

3. The method of claim 2 wherein said step of analyzing each of said sub-patterns includes the step of determining a curvature at each corresponding area of said object.

4. The method of claim 3 wherein said step of analyzing each of said sub-patterns includes the step of determining an Euler's number at each corresponding area of said object.

5. The method of claim 3 wherein said step of analyzing each of said sub-patterns includes the step of determining an angle corresponding to the curvature at each corresponding area of said object.

6. The method of claim 2 wherein said step of analyzing each of said sub-patterns includes the step of determining a distance to each corresponding area of said object.

7. The method of claim 1 wherein said step of projecting light on said object comprises the step of projecting a plurality of light beams on said object.

8. The method of claim 7 wherein said step of projecting a plurality of light beams comprises the step of projecting a plurality of laser beams on said object.

9. The method of claim 2 and further comprising the step of storing said information in a file.

10. The method of claim 1 wherein said scanning step comprises the steps of:

scanning the object through an optical slit relative to a first plane of normal perspective which intersects said object in a first direction using relative motion between the slit and the object; and scanning the object through the optical slit relative to a second plane of normal perspective which intersects said object in a second direction using relative motion between the slit and the object.

11. Apparatus for determining the shape of an object, comprising:

an image receiver for scanning the object through an optical slit moving using relative motion between the slit and the object;

a light source for projecting light on said object in a predetermined sequence to form a pattern on the object;

a memory for recording an image of a reflection of said pattern received through said optical slit as the object is scanned; and circuitry for analyzing the geometric properties of the reflection of said pattern to determine the shape of said object.

12. The apparatus of claim 11 wherein said pattern includes a plurality of discernable sub-patterns and said circuitry for analyzing said object includes the circuitry for analyzing each of said sub-patterns to determine shape information at a corresponding area of the object.

13. The apparatus of claim 11 wherein said circuitry for analyzing each of said sub-patterns includes circuitry for determining a curvature at each corresponding area of said object.

14. The apparatus of claim 13 wherein said circuitry for analyzing each of said sub-patterns includes circuitry for determining an Euler's number at each corresponding area of said object.

15. The apparatus of claim 13 wherein said circuitry for analyzing each of said sub-patterns includes circuitry for determining an angle corresponding to the curvature at each corresponding area of said object.

16. The apparatus of claim 12 wherein said circuitry for analyzing each of said sub-patterns includes circuitry for determining a distance to each corresponding area of said object.

17. The apparatus of claim 11 wherein said circuitry for projecting light on said object comprises circuitry for projecting a plurality of light beams on said object.

18. The apparatus of claim 17 wherein said circuitry for projecting a plurality of light beams comprises circuitry for projecting a plurality of laser beams on said object.

19. The apparatus of claim 12 and further comprising circuitry for storing said information in a file.

20. The apparatus of claim 11 wherein said pattern is a grid.

21. A method of determining the shape of an object, comprising the steps of:

scanning the object through an optical slit oriented in a first direction moving using relative motion in a second direction between the slit and the object;

projecting a light pattern on said object during said relative motion, said light pattern forming demarcations of known dimension in said first direction on said object, said demarcations received through said optical slit; and analyzing said received demarcations to determine the shape of the object.

22. The method of claim 21 wherein said projecting step comprises the step of projecting a light pattern from a light source adjacent said optical slit.

23. The method of claim 21 wherein said projecting step comprises the step of projecting a light pattern from a light source comprising a plurality of individual light emitters oriented in a line in said first direction, wherein ones of said individual light emitters can be selectively enabled independent of other of said individual light emitters.

24. Apparatus for determining the shape of an object, comprising the steps of:

a line scan camera for scanning the object through an optical slit oriented in a first direction moving using relative motion in a second direction between the slit and the object;

a light source for projecting a light pattern on said object during said relative motion, said light pattern forming demarcations of known dimension in said first direction on said object, said demarcations received through said optical slit; and circuitry for analyzing said received demarcations to determine the shape of the object.

25. The apparatus of claim 24 wherein said light source is located adjacent to said line scan camera.

26. The apparatus of claim 24 wherein said light source comprises a plurality of individual light emitters oriented in a line in said first direction; and circuitry for selectively enabling ones of said light emitters independent of other of said individual light emitters.

27. The apparatus of claim 26 wherein said light emitters comprise lasers.

28. A method of determining the shape of an object, comprising the steps of:

scanning the object through an optical slit moving using relative motion between the slit and the object along a path while generating a pattern on the object from multiple points along the path;

recording an image of a reflection of said pattern through said optical slit; and analyzing the geometric properties of the reflection of said pattern to determine the shape of said object.

29. Apparatus for determining the shape of an object, comprising:

an image receiver for scanning the object through an optical slit moving using relative motion between the slit and the object along a path while generating a pattern on the object from multiple points along the path;

a memory for recording an image of a reflection of said pattern through said optical slit; and circuitry for analyzing the geometric properties of the reflection of said pattern to determine the shape of said object.

30. A method of determining the shape of an object, comprising the steps of:

scanning the object through an optical slit moving using relative motion between the slit and the object along a path while generating a pattern on the object from a light source having a substantially fixed relation to the optical slit;

recording an image of a reflection of said pattern through said optical slit; and analyzing the geometric properties of the reflection of said pattern to determine the shape of said object.

31. Apparatus for determining the shape of an object, comprising:

an image receiver for scanning the object through an optical slit moving using relative motion between the slit and the object along a path while generating a pattern on the object from a light source having a substantially fixed relation to the optical slit;

a memory for recording an image of a reflection of said pattern through said optical slit; and circuitry for analyzing the geometric properties of the reflection of said pattern to determine the shape of said object.

32. A method of determining the shape of an object, comprising the steps of:

scanning the object through an optical slit moving using relative motion between the slit and the object along a path while generating a pattern of non-divergent segments on the object from a light source;

recording an image of a reflection of said pattern through said optical slit; and analyzing the geometric properties of the reflection of said pattern to determine the shape of said object.

33. Apparatus for determining the shape of an object, comprising:

an image receiver for scanning the object through an optical slit moving using relative motion between the slit and the object along a path while generating a pattern of non-divergent segments on the object from a light source;

a memory for recording an image of a reflection of said pattern through said optical slit; and circuitry for analyzing the geometric properties of the reflection of said pattern to determine the shape of said object.

\* \* \* \* \*